US007417400B2

(12) United States Patent
Takeishi et al.

(10) Patent No.: US 7,417,400 B2
(45) Date of Patent: Aug. 26, 2008

(54) MOTOR CONTROLLER

(75) Inventors: Tetsuji Takeishi, Nagano-ken (JP); Hirotomo Tanaka, Nagano-ken (JP); Sumito Anzai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 467 days.

(21) Appl. No.: 10/362,447

(22) PCT Filed: Jul. 5, 2002

(86) PCT No.: PCT/JP02/06849

§ 371 (c)(1), (2), (4) Date: Aug. 18, 2003

(87) PCT Pub. No.: WO03/005554

PCT Pub. Date: Jan. 16, 2003

(65) Prior Publication Data

US 2004/0052565 A1 Mar. 18, 2004

(30) Foreign Application Priority Data

Jul. 6, 2001 (JP) ............................ 2001-206670
Jul. 6, 2001 (JP) ............................ 2001-206671
Jul. 6, 2001 (JP) ............................ 2001-206672
Aug. 31, 2001 (JP) ............................ 2001-264662

(51) Int. Cl.
*G05B 11/28* (2006.01)

(52) U.S. Cl. ....................... 318/599; 318/811; 318/609; 318/610; 318/459; 318/504

(58) Field of Classification Search ................ 318/599, 318/811, 504, 609, 610, 459, 928.1
See application file for complete search history.

(56) References Cited

U.S. PATENT DOCUMENTS 4,580,084 A 4/1986 Takahashi (Continued)

FOREIGN PATENT DOCUMENTS

JP 61056715 A 3/1986

(Continued)

OTHER PUBLICATIONS

International Search Report of PCT/JP02/06849 dated Sep. 3, 2002.

*Primary Examiner*—Lincoln Donovan
*Assistant Examiner*—Erick Glass
(74) *Attorney, Agent, or Firm*—Sughrue Mion, PLLC

(57) ABSTRACT

The present invention is a motor control device comprising a control system, the control system being capable of controlling the motor by PWM and having integration means being capable of outputting an integrated value obtained by integrating a deviation between a rotation speed and a target rotation speed of a motor, the motor control device being capable of starting control with the control system for causing the motor to rotate at the target rotation speed after rotation of the motor has been started. In this motor control device, an output value of the integration means at a time when control with the control system is to be started is set to have a value that corresponds to a counter electromotive force generated in the motor by its rotation.

26 Claims, 19 Drawing Sheets

U.S. PATENT DOCUMENTS

| | | | | | |
|---|---|---|---|---|---|
| 4,869,610 | A * | 9/1989 | Nishizawa et al. | 400/322 |
| 5,384,526 | A * | 1/1995 | Bennett | 318/610 |
| 5,467,173 | A * | 11/1995 | Sakata et al. | 399/208 |
| 6,232,730 | B1 | 5/2001 | Doyama et al. | |
| 6,335,604 | B1 * | 1/2002 | Kataoka | 318/609 |

FOREIGN PATENT DOCUMENTS

| | | | |
|---|---|---|---|
| JP | 11-206178 | A1 | 7/1999 |
| JP | 2001-128474 | A1 | 5/2001 |
| JP | 2001-169584 | A1 | 6/2001 |

* cited by examiner (a)

FIG. 18 (a)

| DXIavr | THRESHOLD (rad) | STANDSTILL TIME (sec) | PERMITTED ROTATION AMOUNT (rad) |
|---|---|---|---|
| 20~80 | 30000000 | 5 | 18000 |
| 80~100 | 20000000 | 5 | 18000 |
| equal to or over 100 | — | — | — |

FIG. 18 (b)

| DXIavr | THRESHOLD (rad) | STANDSTILL TIME (sec) | PERMITTED ROTATION AMOUNT (rad) |
|---|---|---|---|
| 20~80 | 20000000 | 5 | 18000 |
| 80~100 | 20000000 | 10 | 18000 |
| equal to or over 100 | — | — | — |

FIG. 18 (c)

| DXIavr | THRESHOLD (rad) | STANDSTILL TIME (sec) | PERMITTED ROTATION AMOUNT (rad) |
|---|---|---|---|
| 20~80 | 20000000 | 5 | 18000 |
| 80~100 | 20000000 | 5 | 10000 |
| equal to or over 100 | — | — | — |

MOTOR CONTROLLER

TECHNICAL FIELD

The present invention relates to a motor control device, a motor control method, a motor driving device, a motor driving method, a printer, a computer program, a computer-readable storage medium, and a computer system.

BACKGROUND ART

Presently, motors are used for a variety of information appliances, household appliances and industrial appliances, and various methods for controlling motors have been proposed.

(1) One method for controlling a motor is PWM (pulse width modulation). In PWM control, which is also called "pulse width modulation control," the power that is input into the motor is controlled by arbitrarily changing the width of pulses of a predetermined voltage, during which electricity is supplied.

Furthermore, in general, when a motor turns, a counter electromotive voltage corresponding to the rotation speed is generated inside the motor.

If the motor is controlled by PWM control, then it is an important issue how a high-precision control can be achieved in consideration of the influence of the counter electromotive voltage generated inside the motor in correspondence to the rotation speed of the motor.

(2) One method for controlling a motor is a motor control method, in which driving of the motor is started with an initial driving signal, the rotation speed is sequentially increased by successively adding a predetermined value to the value of the initial driving signal while driving the motor with a driving signal whose signal value is set to that value obtained as a result of successive addition, and when the rotation speed has reached a predetermined rotation speed, the motor is feedback controlled by a control system having an integration means. There is furthermore the motor control method, in which driving of the motor is started with an initial driving signal for letting a gear provided on the motor shaft abut against an engaged gear that engages that gear, and after the motor is driven with a driving signal of a signal value that is larger than the initial driving signal, the rotation speed is sequentially increased by successively adding a predetermined value to that signal value while driving the motor with a driving signal whose signal value is set to that value obtained as a result of successive addition, and when the rotation speed has reached a predetermined rotation speed, the motor is feedback controlled by a control system having integration means.

If the motor is controlled by such a motor control, then the time until the motor has reached a predetermined rotation speed will vary depending on the driving load of the motor if the initial driving signal or the like is set to a constant value regardless of the driving load of the motor. That is to say, if the driving load of the motor is small, then the predetermined rotation speed will be reached in a short period of time, and on the contrary, if the driving load of the motor is large, then a long period of time will be needed to reach the predetermined rotation speed.

(3) A variety of motors are used at present for various kinds of information appliances, household appliances and industrial appliances. Among these motors, electromagnetic motors have a wiring resistance inside the motor, so that if one lets the motor rotate continuously, the motor will heat up. If the motor heats up and reaches a temperature outside the range in which proper operation is guaranteed, then there will be a risk that the motor will be damaged. To address this problem, operation of the motor is halted for a while when the motor becomes hot due to the generated heat, and cooling of the motor is performed.

However, the heating of the motor differs depending on the driving load of the motor. That is to say, when the driving load of the motor is large, then the amount of heat generated by the motor will become large, whereas if the driving load of the motor is small, the amount of heat generated by the motor will be small.

Consequently, if operation of the motor is halted when the total rotation amount of the motor has reached a predetermined amount, regardless of the driving load of the motor, then, if the driving load of the motor is small, the motor will be halted even though it would be possible to continue operating the motor, and conversely, if the driving load of the motor is large, there will be a danger that the motor will be operated in a state in which the guaranteed operating temperature of the motor is exceeded.

(4) Motors are used at present for various kinds of information appliances, household appliances and industrial appliances, and also, a variety of control devices for motors have been proposed. One such motor control device is a motor control device controlling the motor by PWM control with a control system having an integration means.

In this motor control device, to recognize the load state of the motor, a so-called measurement is performed, wherein the motor is rotated at a certain rotation speed and the output value of the integration means at that time is detected. Recognizing the load state of the motor with this measurement is advantageous with regard to speed control and position control of the motor.

However, the output value of the integration means that is attained with this measurement is not the absolute value of the load, and should rather be termed a value corresponding to the load.

There are individual differences among motors, and the counter electromotive voltage coefficient, resistance values, etc. take different values for each motor. Thus, errors occur when calculating the value of the current flowing through the motor by indiscriminately using the counter electromotive voltage coefficient and resistance value of a predetermined motor, based on the output value of the integration means obtained by a measurement at a certain load state.

Consequently, in order to perform control with regard to the absolute motor load, that is, the current actually flowing through the motor, it is necessary to convert the output value of the integration means obtained by measurement to the absolute load value (current value), giving consideration to the individual differences among motors. It should be noted that, as an example of control with regard to the absolute motor load, that is, the current actually flowing through the motor, motor heating control or the like with regard to the current value flowing through the motor can be given.

DISCLOSURE OF THE INVENTION (1) A first invention has been contrived in view of the above problems, and an object thereof is to realize a motor control device, a motor control method, a printer, a computer program, a computer-readable storage medium storing a computer program, and a computer system, which can control a motor by PWM control with high precision.

In order to achieve this object, according to a first invention, in a motor control device that comprises a control system, the control system being capable of controlling the motor by PWM and having integration means being capable of outputting an integrated value obtained by integrating a deviation between a rotation speed and a target rotation speed of a motor, the motor control device being capable of starting control with the control system for causing the motor to rotate at the target rotation speed after rotation of the motor has been started, mainly, an output value of the integration means at a time when control with the control system is to be started is set to have a value that corresponds to a counter electromotive force generated in the motor by its rotation.

Furthermore, in another first main invention, in a motor control device comprising a control system that is capable of controlling a motor by PWM based on a deviation between a rotation speed and a target rotation speed of the motor, the motor is controlled in accordance with a load of the motor due to a counter electromotive force generated in the motor.

(2) A second invention has been contrived in view of the above problems, and an object thereof is to realize a motor control device, a motor control method, a printer, a computer program, a computer-readable storage medium storing a computer program, and a computer system, which can suitably control a motor in accordance with the driving load of the motor.

In order to achieve this object, according to a present second invention, in a motor control device for starting driving of a motor with an initial driving signal, causing a rotation speed to increase by successively adding a predetermined value to a value of this initial driving signal while sequentially driving the motor with a driving signal whose signal value has a value obtained as a result of the successive addition, and, when the rotation speed has reached a predetermined rotation speed, performing feedback control of the motor by a control system having integration means, mainly, at least one of the initial driving signal value and the predetermined value is set in accordance with a driving load of the motor.

Furthermore, according to another second main invention, in a motor control device for starting driving of a motor with an initial driving signal which is for causing a gear provided on a motor shaft to abut against an engaged gear that engages the gear, then, after driving the motor with a driving signal having a signal value larger than a value of the initial driving signal, causing a rotation speed to increase by successively adding a predetermined value to this signal value while sequentially driving the motor with a driving signal whose signal value has a value obtained as a result of the successive addition, and, when the rotation speed has reached a predetermined rotation speed, performing feedback control of the motor by a control system having integration means, at least one of the initial driving signal value, the signal value larger than the initial driving signal value, and the predetermined value is set in accordance with a driving load of the motor.

(3) A third invention has been contrived in view of the above problems, and an object thereof is to realize a motor driving device, a motor driving method, a printer, a computer program, a computer-readable storage medium storing a computer program, and a computer system, which can suitably drive a motor in accordance with the driving load of the motor.

In order to achieve this object, according to a present third invention is a motor driving device, in a motor driving device for driving a motor while providing a forced standstill period when a total rotation amount of the motor reaches a threshold after starting rotation of the motor, at least one of the threshold, a length of the standstill period, and a rotation amount of the motor that is permitted after the standstill period has ended until entering a next standstill period is set in accordance with a driving load of the motor.

(4) A fourth invention has been contrived in view of the above problems, and an object thereof is to realize a motor control device and a printer with which an output value of the integration means obtained by measurement is converted into an absolute load value (current value), in consideration of individual differences among motors.

In order to achieve this object, according to a present fourth invention, obtained is a relation between a difference between an output value of an integral element when a measurement was performed at a first rotation speed and an output value of the integral element when a measurement was performed at a second rotation speed, and an error occurring in a result of calculating a value of a current flowing through a motor when the difference occurs; and the motor is controlled using the relation.

It should be noted that it is also possible to appreciate the present invention from different viewpoints. Furthermore, other features of the present invention will be made apparent from the accompanying drawings and the disclosure of the description.

BRIEF DESCRIPTION OF THE DRAWINGS

FIG. 4(*b*) is a timing chart showing the waveform of the two output signals of the encoder 11 during reverse rotation of the CR motor.

FIG. 8(*b*) is a graph showing the motor rotation speed.

FIG. 9 is a flowchart showing the procedure of an ordinary printer control method when the power is turned ON.

FIG. 13(*b*) is a diagram for explaining the control characteristics for the case where the output value of the integral element 6*g* has been set to a value obtained by calculation.

In FIG. 18, FIG. 18(*a*) is a diagram showing an example in which the threshold is set in accordance with the driving load. FIG. 18(*b*) is a diagram showing an example in which the length of the standstill period is set in accordance with the driving load. FIG. 18(*c*) is a diagram showing an example in which rotation amount of the PF motor 1 that is permitted after termination of a standstill period until entering of the next standstill period (permitted rotation amount) is set in accordance with the driving load.

BEST MODE FOR CARRYING OUT THE INVENTION

===Outline of the Disclosure===

Figure 1:
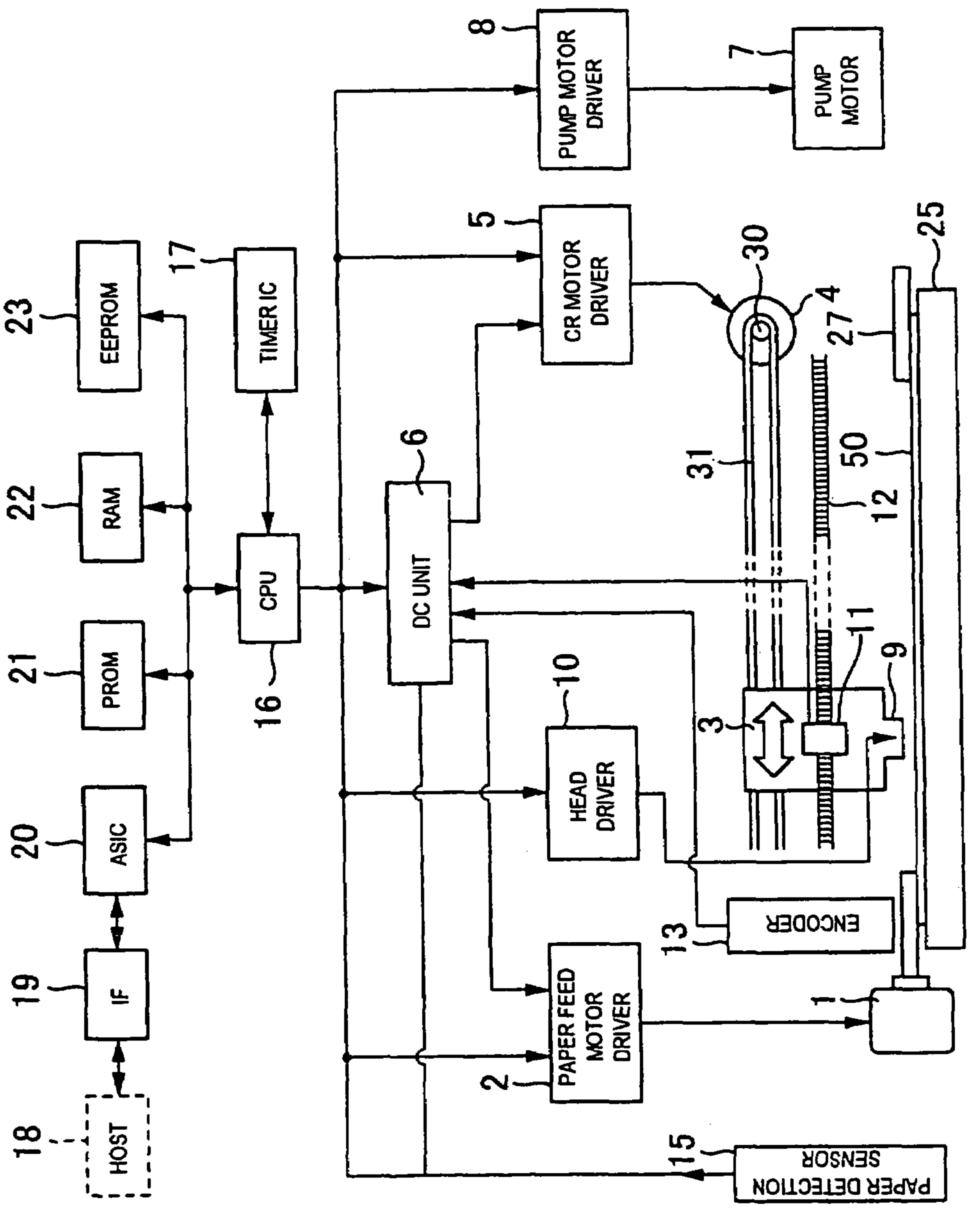
FIG. 1 is a block diagram showing the overall configuration of the inkjet printer.

At least the following aspects become clear from the below disclosure.

A motor control device comprises a control system, the control system being capable of controlling the motor by PWM and having integration means being capable of outputting an integrated value obtained by integrating a deviation between a rotation speed and a target rotation speed of a motor, the motor control device being capable of starting control with the control system for causing the motor to rotate at the target rotation speed after rotation of the motor has been started, wherein an output value of the integration means at a time when control with the control system is to be started is set to have a value that corresponds to a counter electromotive force generated in the motor by its rotation.

In a motor control device comprising a control system that has integration means performing integration of a deviation between a rotation speed and a target rotation speed of a motor and performing output of a value corresponding to a value of the integration and that controls the motor by PWM, and starting control with the control system for causing the motor to rotate at the target rotation speed after rotation of the motor has been started, if the output value of the integration means at the time when control with the control system was started is inappropriate, the controllability of the motor becomes poor. When the motor rotates, a counter electromotive force corresponding to the rotation speed is generated inside the motor. Therefore, if, for example, the output value of the integration means at the time when the control was started is set to a constant value irrespective of the target rotation speed, then a considerable time may be needed until the rotation speed of the motor follows the target rotation speed and the output value of the integration means takes on a suitable value. In order to address this problem, the output value of the integration means at the time when the control with the control system was started is set to a value corresponding to the counter electromotive force generated in the motor by its rotation. Thus, the time it takes for the rotation speed of the motor to follow the target rotation speed and the output value of the integration means to take on a suitable value can be shortened, and the motor controllability of the motor control device can be improved.

Furthermore, for each of a plurality of target rotation speeds, a relation between the target rotation speed and the output value of the integration means when the motor was controlled by the control system to rotate at that target rotation speed may be stored, and based on the stored relation, the output value of the integration means at the time when the control is to be started may be set to have a value corresponding to the target rotation speed.

Accordingly, since the output value of the integration means at the time when the control was started is set to a value corresponding to the target rotation speed based on an actually measured value, it becomes possible to improve the controllability of the motor even further.

Furthermore, the relation between the target rotation speed and the output value of the integration means nay be acquired when a difference between the rotation speed and the target rotation speed of the motor controlled by the control system has become equal to or less than a predetermined value.

Accordingly, since the output value of the integration means at the time when the control was started is set to a value corresponding to the target rotation speed based on an actually measured value in a further suitable manner, it becomes possible to improve the controllability of the motor even further.

Furthermore, an output value I1 of the integration means when the motor is being controlled by the control system to rotate at a target rotation speed V1, and an output value I2 of the integration means when the motor is being controlled by the control system to rotate at a target rotation speed V2 which is different from the rotation speed V1 may be stored, and the output value of the integration means at the time when the control is to be started may be determined based on a calculation using the V1, the V2, the I1 and the I2.

Upon storing for each of a plurality of target rotation speeds the relation between a rotation speed of the motor and an output value of the integration means when the motor was controlled by the control system to rotate at the target rotation speed and setting the output value of the integration means at the time when the control is to be started to a value corresponding to the target rotation speed based on the stored relation, a problem may arise in process efficiency if it were to determine and store the relation between the target rotation speed of the motor and the output value of the integration means for many target rotation speeds.

It will be efficient if an output value I1 of the integration means when the motor is being controlled by the control system to rotate at a target rotation speed V1, and an output value I2 of the integration means when the motor is being controlled by the control system to rotate at a target rotation speed V2 which is different from the rotation speed V1 are stored, and the output value of the integration means at the time when the control is to be started is determined based on a calculation using the V1, the V2, the I1 and the I2.

Furthermore, in this motor control device, when VMAX is a maximum rotation speed of the motor, the V1 and the V2 may satisfy relations $0<V1 \leqq (2\times VMAX/3)$ and $0<V2 \leqq (2\times VMAX/3)$.

When the motor rotates at a relatively fast speed, then the time from starting the control with the control system until the motor is halted is relatively long; therefore, a very precise position control of the motor is possible with the control system. By contrast, when the motor rotates at a relatively slow speed, the motor will be halted soon after the control begins; therefore, if the output value, of the integration means at the start of the control is not suitably set, then there is the possibility that the precision of positioning the motor may drop. Then, by letting V1 and V2 satisfy the relations $0<V1 \leqq (2\times VMAX/3)$ and $0<V2 \leqq (2\times VMAX/3)$, it becomes possible to position the motor with high precision even when the motor rotates at a relatively slow speed.

Furthermore, the control system may further comprise derivative means being capable of outputting a value corresponding to a derivative value obtained by differentiating the deviation between the rotation speed and the target rotation speed of the motor, and proportional means being capable of outputting a value that is proportional to the deviation between the rotation speed and the target rotation speed of the motor. Accordingly, it becomes possible to further improve the control characteristics with the control system.

Furthermore, the motor may be a paper-feed motor of a printer. With favorable control of the paper-feed motor of a printer, it becomes possible to improve the printing quality of the printer.

Furthermore, the motor may be a carriage motor of a printer. With favorable control of the carriage motor of a printer, it becomes possible to improve the printing quality of the printer.

Furthermore, it is also possible to realize a motor control method relating to motor control, such as motor control method comprising preparing a control system being capable of controlling the motor by PWM and having an integral element being capable of outputting an integrated value obtained by integrating a deviation between a rotation speed and a target rotation speed of a motor, and starting control with the control system for causing the motor to rotate at the target rotation speed after rotation of the motor has been started, the method comprising setting an output value of the integral element at a time when control with the control system is to be started to have a value that corresponds to a counter electromotive force generated in the motor by its rotation.

Furthermore, it is also possible to realize a printer performing such a motor control, such as a printer comprising a control system, the control system being capable of controlling the motor by PWM and having integration means being capable of outputting an integrated value obtained by integrating a deviation between a rotation speed and a target rotation speed of a motor, the printer being capable of starting control with the control system for causing the motor to rotate at the target rotation speed after rotation of the motor has been started, wherein an output value of the integration means at a time when control with the control system is to be started is set to have a value that corresponds to a counter electromotive force generated in the motor by its rotation.

Furthermore, it is also possible to realize a computer program capable of causing a motor control device execute such a motor control, such as a computer program for a motor control device, the motor control device comprising a control system that is capable of controlling the motor by PWM and that has integration means being capable of outputting an integrated value obtained by integrating a deviation between a rotation speed and a target rotation speed of a motor, the motor control device being capable of starting control with the control system for causing the motor to rotate at the target rotation speed after rotation of the motor has been started, the computer program being capable of causing the motor control device to set an output value of the integration means at a time when control with the control system is to be started to have a value that corresponds to a counter electromotive force generated in the motor by its rotation.

Furthermore, it is also possible to realize a computer-readable storage medium storing such a computer program, such as a computer-readable storage medium storing a computer program for a motor control device, the motor control device comprising a control system that is capable of controlling the motor by PWM and that has integration means being capable of outputting an integrated value obtained by integrating a deviation between a rotation speed and a target rotation speed of a motor, the motor control device being capable of starting control with the control system for causing the motor to rotate at the target rotation speed after rotation of the motor has been started, the computer program being capable of causing the motor control device to set an output value of the integration means at a time when control with the control system is to be started to have a value that corresponds to a counter electromotive force generated in the motor by its rotation.

Furthermore, it is also possible to realize a computer system comprising: a main computer unit; a display device; an input device; and a printer having a control system that is capable of controlling the motor by PWM and that has integration means being capable of outputting an integrated value obtained by integrating a deviation between a rotation speed and a target rotation speed of a motor, and being capable of starting control with the control system for causing the motor to rotate at the target rotation speed after rotation of the motor has been started, wherein an output value of the integration means at a time when control with the control system is to be started is set to have a value that corresponds to a counter electromotive force generated in the motor by its rotation.

Furthermore, it is also possible to realize a printer comprising an image processor, a display section, a recording media mounting section, and a control system that is capable of controlling a motor by PWM and that has integration means being capable of outputting an integrated value obtained by integrating a deviation between a rotation speed and a target rotation speed of the motor, the printer being capable of starting control with the control system for causing the motor to rotate at the target rotation speed after rotation of the motor has been started, wherein an output value of the integration means at a time when control with the control system is to be started is set to have a value that corresponds to a counter electromotive force generated in the motor by its rotation.

Furthermore, it is also possible to realize a motor control device comprising a control system that is capable of controlling a motor by PWM based on a deviation between a rotation speed and a target rotation speed of the motor, wherein the motor is controlled in accordance with a load of the motor due to a counter electromotive force generated in the motor. It is further possible to realize such a motor control method, a printer, a computer program, a computer-readable storage medium storing a computer program, and a computer system.

Furthermore, in a motor control device for starting driving of a motor with an initial driving signal, causing a rotation speed to increase by successively adding a predetermined value to a value of this initial driving signal while sequentially driving the motor with a driving signal whose signal value has a value obtained as a result of the successive addition, and, when the rotation speed has reached a predetermined rotation speed, performing feedback control of the motor by a control system having integration means, at least one of the initial driving signal value and the predetermined value is set in accordance with a driving load of the motor.

Since at least one of the initial driving signal value and the predetermined value is set in accordance with the driving load of the motor, the time until the motor reaches a predetermined rotation speed can be made to be about the same, regardless of whether the driving load of the motor is large or small.

Furthermore, the motor may be driven by PWM; the initial driving signal value may be an initial duty; the predetermined value may be a predetermined duty; and at least one of the initial duty and the predetermined duty may be set in accordance with an output value of the integration means when control of the motor was carried out with the control system.

There are a variety of methods for actually measuring or estimating the driving load of the motor. For example, it is possible to measure the driving load by connecting, to the motor, a measurement equipment for measuring driving loads. However, if the driving load of the motor is measured by this method, then there will be several complications, for example, a separate measurement equipment becomes necessary and additional work will be needed to connect the measurement equipment. On the contrary, by setting at least one of the initial duty and the predetermined duty in accordance with an output value of the integration means when control of the motor was carried out with the control system, then it will become possible to set the control constants with high precision to values corresponding to the driving load in a simple way.

Furthermore, for each of a plurality of target rotation speeds, a relation between the target rotation speed and the output value of the integration means when the motor was controlled by the control system to rotate at that target rotation speed may be acquired; and based on the relation, it would be preferable to set at least one of the initial duty and the predetermined duty.

Thus, it becomes possible to set the control constants during acceleration control in consideration of the influence of the counter electromotive force that is generated in the motor depending on the rotation speed.

Furthermore, the relation between the target rotation speed and the output value of the integration means may be acquired when a difference between the rotation speed and the target rotation speed of the motor being controlled by the control system has become equal to or less than a predetermined value.

In this case, it becomes possible to set the control constants during acceleration control more suitably based on the actually measured values.

Furthermore, in a motor control device for starting driving of a motor with an initial driving signal which is for causing a gear provided on a motor shaft to abut against an engaged gear that engages the gear, then, after driving the motor with a driving signal having a signal value larger than a value of the initial driving signal, causing a rotation speed to increase by successively adding a predetermined value to this signal value while sequentially driving the motor with a driving signal whose signal value has a value obtained as a result of the successive addition, and, when the rotation speed has reached a predetermined rotation speed, performing feedback control of the motor by a control system having integration means, at least one of the initial driving signal value, the signal value larger than the initial driving signal value, and the predetermined value is set in accordance with a driving load of the motor.

Since at least one of the initial driving signal value, the signal value that is larger than the initial driving signal value, and the predetermined value is set in accordance with the driving load of the motor, the time required for the motor to reach a predetermined rotation speed can be made to be about the same regardless of whether the driving load of the motor is large or small.

Furthermore, the motor may be driven by PWM; the initial driving signal value may be an initial duty; the predetermined value may be a predetermined duty; and at least one of the initial driving signal value, the signal value larger than the initial driving signal value, and the predetermined duty may be set based on an output value of the integration means when control of the motor was carried out with the control system.

Since at least one of the initial driving signal value, the signal value that is larger than the initial driving signal value, and the predetermined value is set based on the output value of the integration means when the motor is controlled with the control system, it becomes possible to set the control constants with high precision to values corresponding to the driving load in a simple way.

Furthermore, for each of a plurality of target rotation speeds, a relation between the target rotation speed and the output value of the integration means when the motor was controlled by the control system to rotate at that target rotation speed may be acquired; and based on the relation, at least one of the initial driving signal value, the signal value larger than the initial driving signal value, and the predetermined duty may be set.

Thus, it becomes possible to set the control constants during acceleration control in consideration of the influence of the counter electromotive force generated in the motor in accordance with the rotation speed.

Furthermore, the relation between the target rotation speed and the output value of the integration means may be acquired when a difference between the rotation speed and the target rotation speed of the motor controlled by the control system has become equal to or less than a predetermined value.

Thus, it becomes possible to set the control constants during acceleration control more suitably according to actually measured values.

Furthermore, the motor may be a paper-feed motor of a printer. With favorable control of the paper-feed motor of a printer, it becomes possible to improve the printing quality of the printer.

Furthermore, the motor may be a carriage motor of a printer. With favorable control of the carriage motor of a printer, it becomes possible to improve the printing quality of the printer.

Furthermore, it is also possible to realize a motor control method relating to such a motor control, such as a motor control method comprising starting driving of a motor with an initial driving signal, causing a rotation speed to increase by successively adding a predetermined value to a value of this initial driving signal while sequentially driving the motor with a driving signal whose signal value has a value obtained as a result of the successive addition, and, when the rotation speed has reached a predetermined rotation speed, performing feedback control of the motor by a control system having an integral element, the method comprising setting at least one of the initial driving signal value and the predetermined value in accordance with a driving load of the motor.

Furthermore, it is also possible to realize a printer executing such a motor control, such as a printer for starting driving of a motor with an initial driving signal, causing a rotation speed to increase by successively adding a predetermined value to a value of this initial driving signal while sequentially driving the motor with a driving signal whose signal value has a value obtained as a result of the successive addition, and, when the rotation speed has reached a predetermined rotation speed, performing feedback control of the motor by a control system having integration means, wherein at least one of the initial driving signal value and the predetermined value is set in accordance with a driving load of the motor.

Furthermore, it is also possible to realize a computer program capable of causing a motor control device to execute such a motor control, such as a computer program for a motor control device, the motor control device being capable of starting driving of a motor with an initial driving signal, causing a rotation speed to increase by successively adding a predetermined value to a value of this initial driving signal while sequentially driving the motor with a driving signal whose signal value has a value obtained as a result of the successive addition, and, when the rotation speed has reached a predetermined rotation speed, performing feedback control of the motor by a control system having integration means, the computer program being capable of causing the motor control device to set at least one of the initial driving signal value and the predetermined value in accordance with a driving load of the motor.

Furthermore, it is also possible to realize a computer-readable storage medium storing such a computer program, such as a computer-readable storage medium storing a computer program for a motor control device, the motor control device being capable of starting driving of a motor with an initial driving signal, causing a rotation speed to increase by successively adding a predetermined value to a value of this initial driving signal while sequentially driving the motor with a driving signal whose signal value has a value obtained as a result of the successive addition, and, when the rotation speed has reached a predetermined rotation speed, performing feedback control of the motor by a control system having integration means, the computer program being capable of causing the motor control device to set at least one of the initial driving signal value and the predetermined value in accordance with a driving load of the motor.

Furthermore, it is also possible to realize a computer system comprising: a main computer unit; a display device; an input device; and a printer being capable of starting driving of a motor with an initial driving signal, causing a rotation speed to increase by successively adding a predetermined value to a value of this initial driving signal while sequentially driving the motor with a driving signal whose signal value has a value obtained as a result of the successive addition, and, when the rotation speed has reached a predetermined rotation speed, performing feedback control of the motor by a control system having integration means, wherein at least one of the initial driving signal value and the predetermined value is set in accordance with a driving load of the motor.

Furthermore, it is also possible to realize a printer comprising an image processor, a display section, and a recording media mounting section, and being capable of starting driving of a motor with an initial driving signal, causing a rotation speed to increase by successively adding a predetermined value to a value of this initial driving signal while sequentially driving the motor with a driving signal whose signal value has a value obtained as a result of the successive addition, and, when the rotation speed has reached a predetermined rotation speed, performing feedback control of the motor by a control system having integration means, wherein at least one of the initial driving signal value and the predetermined value is set in accordance with a driving load of the motor.

Furthermore, in a motor driving device for driving a motor while providing a forced standstill period when a total rotation amount of the motor reaches a threshold after starting rotation of the motor, wherein at least one of the threshold, a length of the standstill period, and a rotation amount of the motor that is permitted after the standstill period has ended until entering a next standstill period is set in accordance with a driving load of the motor.

Since at least one of the threshold, the length of the standstill period, and the rotation amount of the motor that is permitted after terminating a standstill period until entering the next standstill period is set in accordance with the driving load of the motor, it becomes possible to realize a suitable heating countermeasure corresponding to the driving load of the motor.

Furthermore, the motor may be driven by PWM with a control system that has integration means performing integration of a deviation between a rotation speed and a target rotation speed of the motor and performing output of a value corresponding to a value of the integration; and at least one of the threshold, a length of the standstill period, and a rotation amount of the motor that is permitted after the standstill period has ended until entering a next standstill period may be set in accordance with an output value of the integration means when control of the motor was carried out with the control system.

There are a variety of methods for actually measuring or estimating the driving load of the motor. For example, it is possible to measure the driving load by connecting, to the motor, a measurement equipment for measuring driving loads. However, if the driving load of the motor is measured by this method, then there will be several complications, for example, a separate measurement equipment becomes necessary and additional work will be needed to connect the measurement equipment. On the contrary, by setting at least one of the threshold, the length of the standstill period, and the rotation amount of the motor that is permitted after terminating a standstill period until entering the next standstill period based on the output value of the integration means when the motor is controlled with the control system, then it becomes possible to perform a heating countermeasure for the motor with high precision using a simple method.

Since at least one of the threshold, the length of the standstill period, and the rotation amount of the motor that is permitted after terminating a standstill period until entering the next standstill period is set based on the output value of the integration means when the motor is controlled with the control system, it becomes possible to realize a more suitable heating countermeasure based on the actually measured values.

Furthermore, in order to acquire the driving load of the motor more precisely, a relation between the target rotation speed and the output value of the integration means may be acquired when a difference between the rotation speed and the target rotation speed of the motor being controlled by the control system has become equal to or less than a predetermined value.

Furthermore, it is preferable that, if the output value of the integration means taken when the motor was controlled with the control system exceeds a predetermined value, then driving of the motor is not performed and a warning is made to a user.

Thus, if the driving load of the motor is extraordinarily large, the possibility that the motor will be driven and damaged can be averted.

Furthermore, it is preferable that the motor is a paper-feed motor of a printer.

In order to operate the printer efficiently, it is necessary to ensure that the paper-feed motor does not stand still more than necessary. By driving the paper-feed motor of the printer by the above-described driving method, the paper-feed motor will not stand still more than necessary, and as a result, it becomes possible to increase the total printing speed of the printer.

Furthermore, it is preferable that the motor is a carriage motor of a printer.

In order to operate the printer efficiently, it is necessary to ensure that the carriage motor does not stand still more than necessary. By driving the carriage motor of the printer by the above-described driving method, the carriage motor will not stand still more than necessary, and as a result, it becomes possible to increase the total printing speed of the printer.

It is also possible to realize a motor driving method relating to such a motor driving device, such as a motor driving method comprising driving a motor while providing a forced standstill period when a total rotation amount of the motor reaches a threshold after starting rotation of the motor, the method comprising setting at least one of the threshold, a length of the standstill period, and a rotation amount of the motor that is permitted after the standstill period has ended until entering a next standstill period in accordance with a driving load of the motor.

It is also possible to realize a printer executing such a motor drive, such as a printer for driving a motor while providing a forced standstill period when a total rotation amount of the motor reaches a threshold after starting rotation of the motor, wherein at least one of the threshold, a length of the standstill period, and a rotation amount of the motor that is permitted after the standstill period has ended until entering a next standstill period is set in accordance with a driving load of the motor.

It is also possible to realize a computer program capable of making a motor driving device execute such a motor drive, such as a computer program capable of making a motor driving device for driving a motor while providing a forced standstill period when a total rotation amount of the motor reaches a threshold after starting rotation of the motor be set with at least one of the threshold, a length of the standstill period, and a rotation amount of the motor that is permitted after the standstill period has ended until entering a next standstill period in accordance with a driving load of the motor.

It is also possible to realize a computer-readable storage medium storing such a computer program, such as a computer-readable storage medium storing a computer program capable of making a motor driving device for driving a motor while providing a forced standstill period when a total rotation amount of the motor reaches a threshold after starting rotation of the motor be set with at least one of the threshold, a length of the standstill period, and a rotation amount of the motor that is permitted after the standstill period has ended until entering a next standstill period in accordance with a driving load of the motor.

It is also possible to realize a computer system comprising: a main computer unit; a display device; an input device; and a printer being capable of driving a motor while providing a forced standstill period when a total rotation amount of the motor reaches a threshold after starting rotation of the motor, wherein at least one of the threshold, a length of the standstill period, and a rotation amount of the motor that is permitted after the standstill period has ended until entering a next standstill period is set in accordance with a driving load of the motor.

Furthermore, a motor control device determines a relation between a difference between an output value of an integral element when a measurement was performed at a first rotation speed and an output value of the integral element when a measurement was performed at a second rotation speed, and an error occurring in a result of calculating a value of a current flowing through a motor when the difference occurs; and controls the motor using the relation.

Furthermore, the motor may be a paper-feed motor of a printer.

Furthermore, the motor may be a carriage motor of a printer.

It is further possible to realize a printer comprising such a motor control device.

===Outline of Inkjet Printer===

Next, explanation will be made of an outline of an inkjet printer to which the present invention is mainly applied. FIG. 1 is a block diagram showing the overall configuration of the inkjet printer.

The inkjet printer shown in FIG. 1 includes the following: a paper feed motor (also referred to as PF motor below) 1 for paper feeding; a paper feed motor driver 2 driving the paper feed motor 1; a carriage 3 to which a head 9 ejecting ink onto printing paper 50 is fixed and which is driven in a direction parallel to the printing paper 50 and vertical to the paper feed direction; a carriage motor (also referred to as CR motor below) 4 driving the carriage 3; a CR motor driver 5 driving the carriage motor 4; a DC unit 6 controlling the CR motor driver 5; a pump motor 7 controlling the sucking out of ink in order to prevent clogging of the head 9; a pump motor driver 8 driving the pump motor 7; a head driver 10 driving and controlling the head 9; a linear encoder 11 fixed to the carriage 3; an encoding plate 12 for the linear encoder 11 in which slits are formed at predetermined intervals; a rotary encoder 13 for the PF motor 1; a paper detection sensor 15 detecting the paper end position of paper that is being printed; a CPU 16 for overall control of the printer; a timer IC 17 generating a periodic interrupt signal for the CPU. 16; an interface (also referred to as IF below) 19 for the sending/receiving of data to/from a host computer 18; an ASIC 20 controlling, for example, the print resolution and the driving waveform of the head 9 based on print information sent from the host computer 18 over the IF 19; a PROM 21, a RAM 22, and an EEPROM 23 used as a working region of the ASIC 20 and the CPU 16, and as a program storage region; a platen 25 supporting the printing paper 50; a carrying roller 27 that is driven by the PF motor 1 to carry the printing paper 50; a pulley 30 that is attached to a rotation shaft of the CR motor 4; and a timing belt 31 that is driven by the pulley 30.

The DC unit 6 drives and controls the paper feed motor driver 2 and the CR motor driver 5 based on control commands sent from the CPU 16 as well as the output of the encoders 11, 13.

===Configuration Surroundings of the Carriage===

Figure 2:
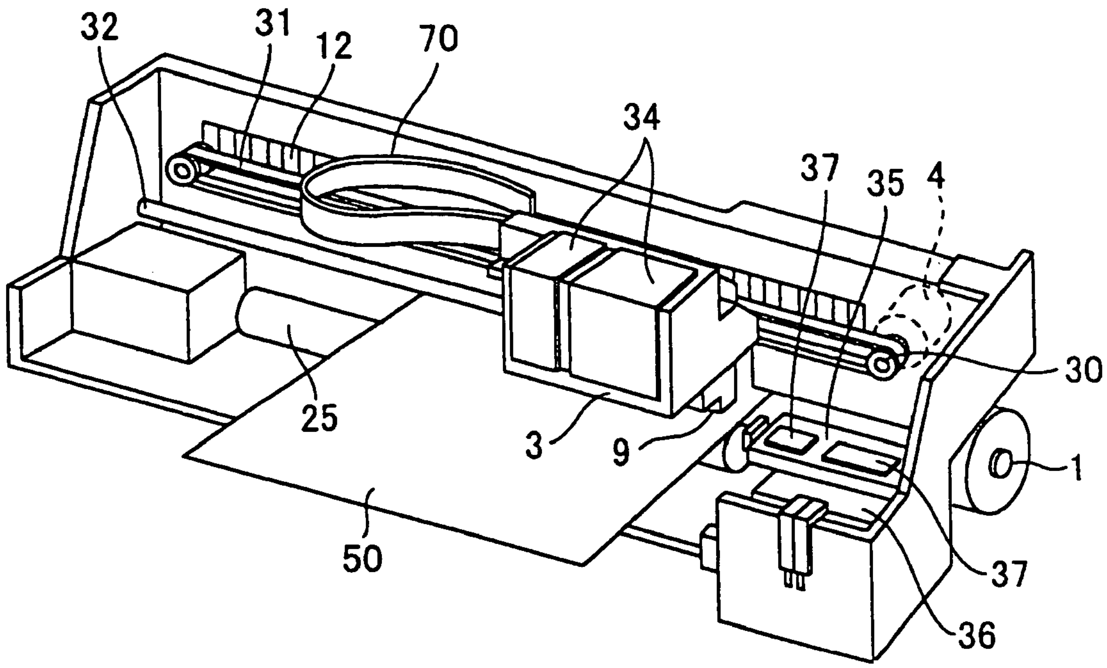
FIG. 2 is a perspective view showing the configuration of the surroundings of the carriage 3 of the inkjet printer.

Next, explanation will be made of the configuration of the surroundings of the carriage. FIG. 2 is a perspective view showing the configuration of the surroundings of the carriage 3 of the inkjet printer.

As shown in FIG. 2, the carriage 3 is connected to the CR motor 4 by the timing belt 31 via the pulley 30, and is driven so that it moves parallel to the platen 25, guided by a guide member 32. On the surface of the carriage 3 that faces the printing paper is provided the head 9, which has a row of nozzles ejecting black ink and rows of nozzles ejecting color ink. The nozzles receive a supply of ink from the ink cartridge 34 and print text or images by ejecting ink drops onto the printing paper.

Furthermore, at a non-printing region of the carriage 3 are provided a capping device 35 for sealing the nozzle apertures of the head 9 when not printing, and a pump unit 36 including the pump motor 7 shown in FIG. 1. When the carriage 3 is moved from the printing region to the non-printing region, the carriage 3 abuts against a lever not shown in the figure, whereby the capping device 35 is shifted upward and seals the head 9.

When the nozzle aperture rows of the nozzle 9 clogs up, or when ink is forcibly ejected from the head 9, for example, when exchanging the ink cartridge 34, the ink is sucked from the nozzle aperture rows with negative pressure from the pump unit 36 by operating the pump unit 36 while keeping the head 9 in the sealed state. Thus, grime and paper dust adhering to the vicinity of the nozzle aperture rows are cleaned, and moreover, air bubbles in the head 9 are ejected together with the ink onto the cap 37.

===Encoders===

Figure 3:
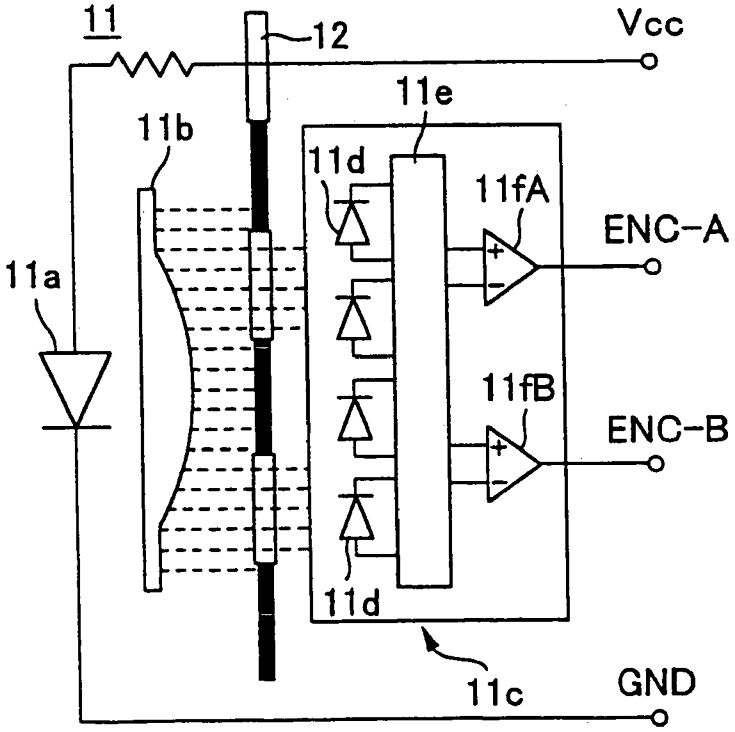
FIG. 3 is an explanatory diagram schematically illustrating the configuration of the linear encoder 11 attached to the carriage 3.

Next, explanation will be made of the linear encoder 11 attached to the carriage 3 and the rotary encoder 13 for the PF motor 1. FIG. 3 is an explanatory diagram schematically illustrating the configuration of the linear encoder 11 attached to the carriage 3.

The encoder 11 shown in FIG. 3 includes a light-emitting diode 11*a*, a collimator lens 11*b*, and a detection processor 11*c*. The detection processor 11*c* includes a plurality of (for example, four) photodiodes 11*d*, a signal processing circuit 11*e*, and, for example, two comparators 11*f*A and 11*f*B.

When a voltage VCC is applied via a resistor to the two terminals of the light-emitting diode 11*a*, light is emitted from the light-emitting diode 11*a*. This light is collimated to a parallel light beam by the collimator lens 11*b* and passes through the encoding plate 12. The encoding plate 12 is provided with slits arranged at predetermined intervals (for example 1/180 inch (1 inch=2.54 cm)).

The parallel light beam that has passed through the encoding plate 12 is incident on the photodiodes 11*d* after passing through a fixed slit not shown in the figure, and is converted into electrical signals. The electrical signals that are output from the four photodiodes 11*d* are processed by the signal processing circuit 11*e*, the signals that are output from the signal processing circuit 11*e* are compared by the comparators 11*f*A and 11*f*B, and the comparison results are output as pulses. The pulses ENC-A and ENC-B that are output from the comparators 11*f*A and 11*f*B are the output of the encoder 11.

Figure 4A:
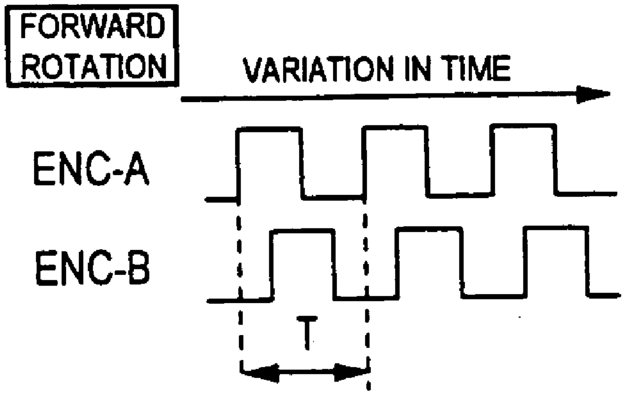
FIG. 4(*a*) is a timing chart showing the waveform of the two output signals of the encoder 11 during forward rotation of the CR motor.
Figure 4B:
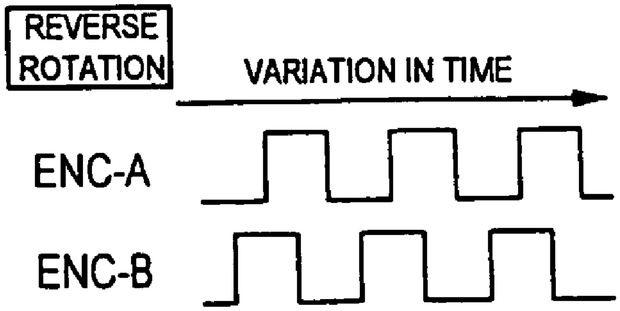

FIG. 4 is a timing chart showing the waveforms of the two output signals of the encoder 11 during forward rotation and reverse rotation of the CR motor.

As shown in FIGS. 4(*a*) and 4(*b*), during both forward rotation and backward rotation of the CR motor, the phases of the pulse ENC-A and the pulse ENC-B differ only by 90°. When the CR motor 4 is in forward rotation, that is, when the carriage 3 is moving in the main-scanning direction, the phase of the pulse ENC-A precedes the phase of the pulse ENC-B by 90°, as shown in FIG. 4(*a*), and when the CR motor 4 is in reverse rotation, the phase of the pulse ENC-A trails the phase of the pulse ENC-B by 90°, as shown in FIG. 4(*b*). One period of the pulse ENC-A and the pulse ENC-B is equal to the time it takes for the carriage 3 to move over a slit interval of the encoding plate 12.

On the other hand, the rotary encoder 13 for the PF motor 1 is configured similar to that of the linear encoder 11, except that the encoding plate 14 for the rotary encoder is a rotating disk that rotates in accordance with the rotation of the PF motor 1. The rotary encoder 13 outputs the two output pulses ENC-A and ENC-B. In an inkjet printer, the slit interval of the plurality of slits provided in the encoding plate 14 for the rotary encoder is 1/180 inch, and when the PF motor 1 rotates over the distance of one slit interval, paper is fed forward by 1/1440 inch.

===Paper Supply and Paper Detection===

Figure 5:
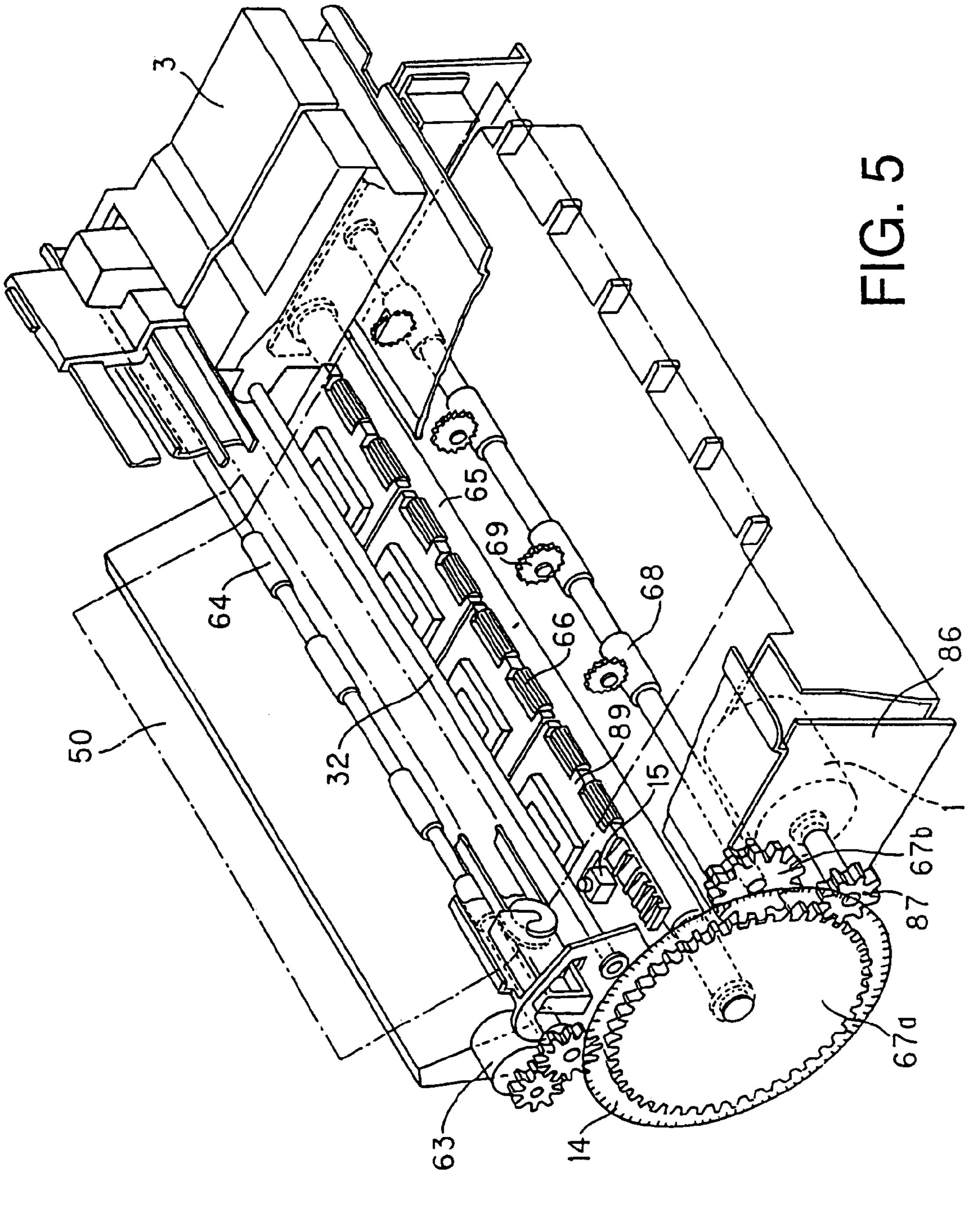
FIG. 5 is a perspective view showing the parts related to paper supply and paper detection.

Next, explanation will be made of parts relevant to paper supply and paper detection. FIG. 5 is a perspective view showing the parts related to paper supply and paper detection.

Referring to FIG. 5, the position of the paper detection sensor 15 shown in FIG. 1 is explained. In FIG. 5, the printing paper 50 that has been inserted into a paper supply insertion port 61 of the printer 60 is fed into the printer 60 with a paper supply roller 64 that is driven by a paper supply motor 63. The leading end of the printing paper 50 that has been fed into the printer 60 is detected, for example, by an optical, paper detection sensor 15. When its leading end has been detected by the paper detection sensor 15, the printing paper 50 is fed forward by the paper-feed roller 65, which is driven by the PF motor 1, and the driven rollers 66.

Subsequently, printing is performed by releasing ink in drops from the head 9, which is fixed to the carriage 3 which moves along the carriage guide member 32. When the paper has been fed to a predetermined position, the terminal end of the printing paper 50 currently being printed is detected by the paper detecting sensor 15. After printing, the printing paper 50 is discharged to the outside from a paper outlet 62 by a discharge roller 68 driven by a gear 67C, which is driven by the PF motor 1 via gears 67A and 67B, and driven rollers 69. It should be noted that the rotation shaft of the paper-feed roller 65 is linked to the rotary encoder 13.

===Paper Feeding===

Figure 6:
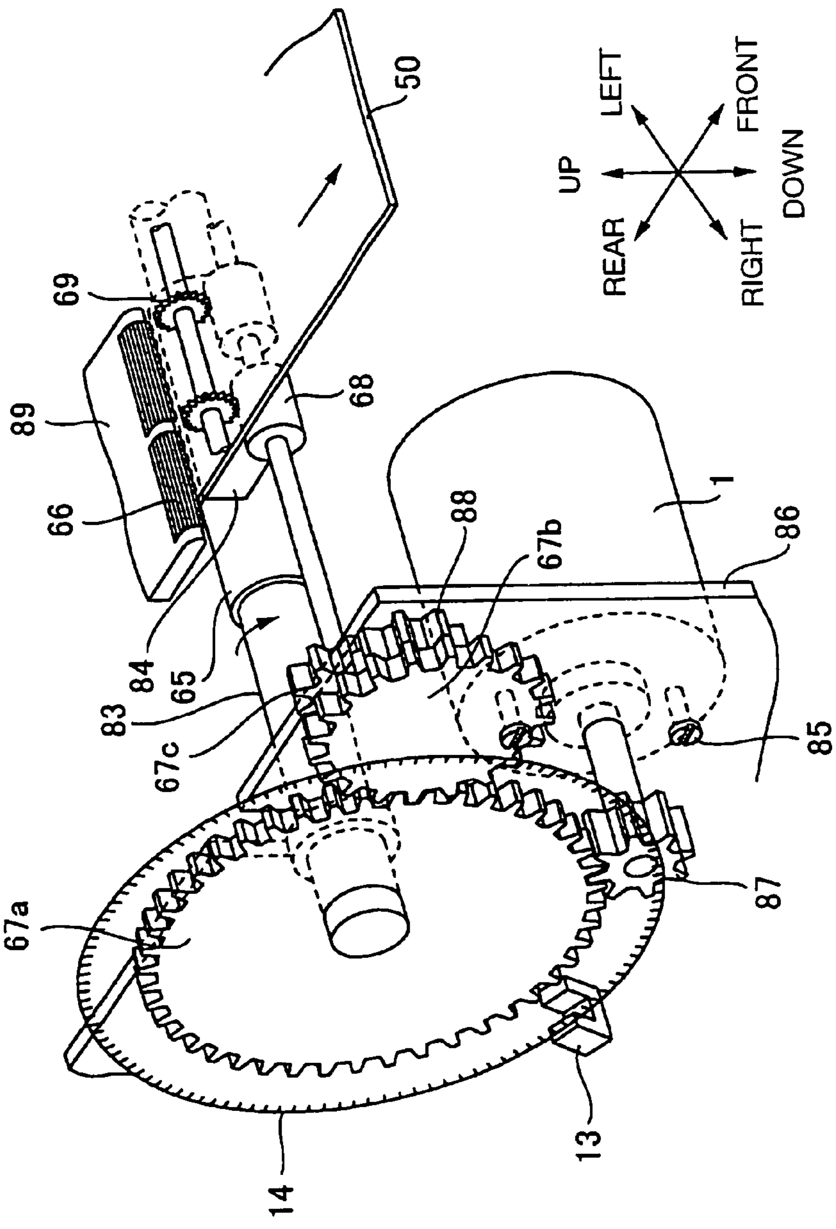
FIG. 6 is a perspective view showing the details of the parts of the printer related to paper feeding.

Next, explanation will be made of the parts related to paper feeding. FIG. 6 is a perspective view showing the details of the parts of the printer related to paper feeding.

Referring to FIG. 5 and FIG. 6, those parts of the printer shown in FIG. 5 that relate to paper feeding are explained in more detail.

When the leading end of the printing paper 50, which has been inserted into the paper supply insertion port 61 of the printer 60 and fed into the printer 60 with the paper supply roller 64, is detected by the paper detection sensor 15, the printing paper 50 is fed by the paper-feed roller 65, which is provided on a smap shaft 83 which is a rotation shaft for a large gear 67*a* driven by the PF motor 1 via a small gear 87, and the driven rollers 66, which are provided on respective paper evacuating ends in the paper feeding direction of holders 89, vertically pressing down the printing paper 50 that has been fed from a paper-supply side.

The PF motor 1 is fixed to a frame 86 in the printer 60 by screws 85, and in a predetermined position peripheral to the large gear 67*a* is placed the rotary encoder 13, whereas to the smap shaft 83, which is the rotation shaft of the large gear 67*a*, is connected the encoding plate 14 for the rotary encoder.

The printing paper 50, which has been fed by the paper-feed roller 65 and the driven rollers 66, passes over a platen 84 for supporting the printing paper 50; and the printing paper 50 is held between and fed with toothed rollers 69, which are driven rollers, and the paper discharge roller 68, which is driven by the PF motor 1 via the small gear 87, the large gear 67*a*, the medium gear 67*b*, a small gear 88, and a paper discharge gear 67*c*; and the printing paper is ejected from the paper outlet 62 to the outside of the printer.

While the printing paper 50 is being supported by the platen 84, the carriage 3 moves laterally in a space above the platen 84 along the guide member 32, and ink is ejected from the head 9 fixed to the carriage 3, to perform printing.

===Configuration of DC Unit===

Figure 7:
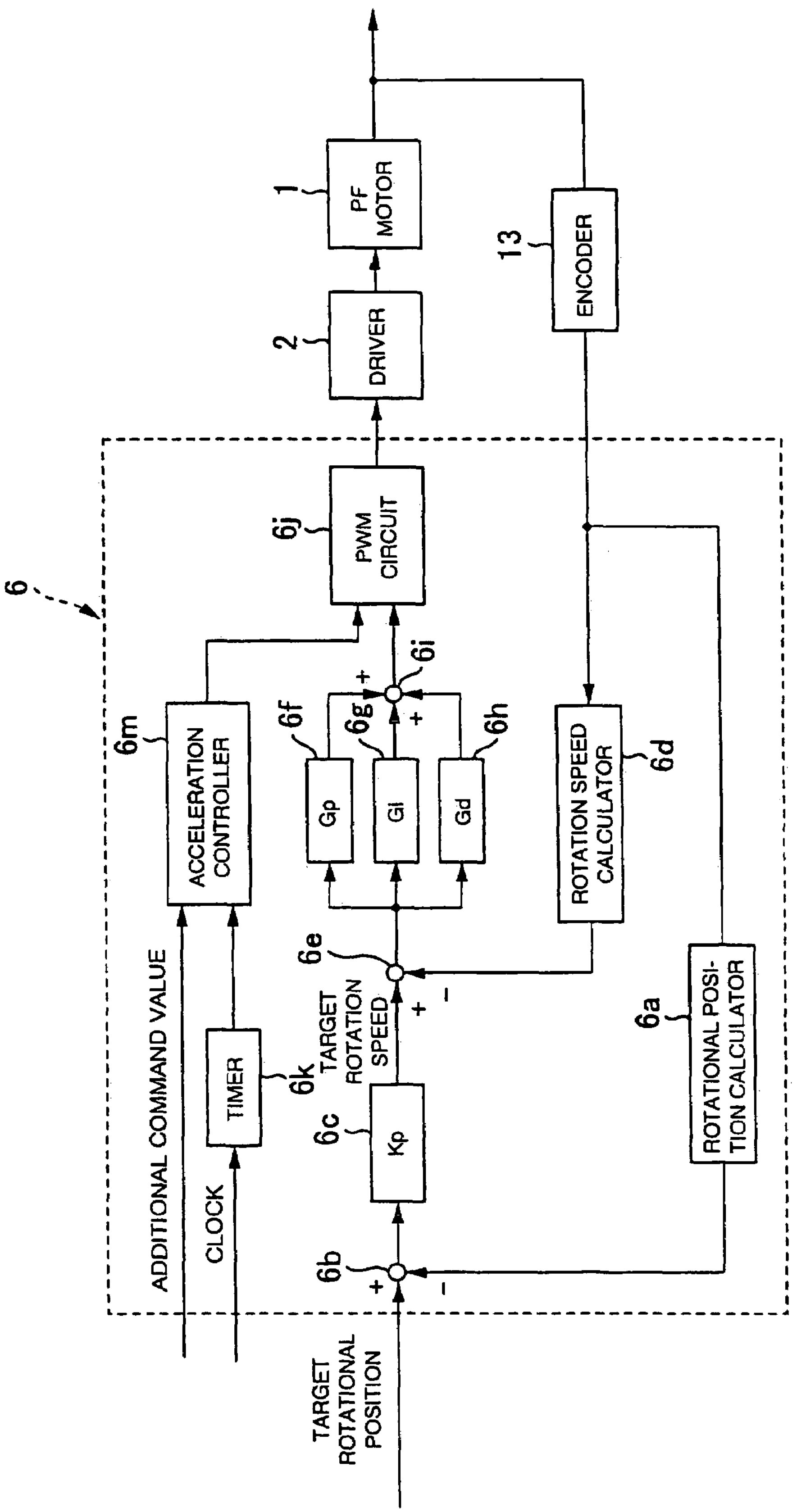
FIG. 7 is a control block diagram of the DC unit 6 serving as the DC motor control device.

Next, explanation will be made of a DC unit 6, which is a DC motor control device that controls the PF motor 1 of the inkjet printer. FIG. 7 is a control block diagram of the DC unit 6 serving as the DC motor control device.

The control block diagram in FIG. 7 shows the following as the main elements for generating the command signals for the driver 2: a rotational position calculator 6*a*; a subtractor 6*b*; a target rotation speed calculator 6*c*; a rotation speed calculator 6*d*; a subtractor 6*e*; a proportional element 6*f* serving as proportional means; an integral element 6*g* serving as integration means; a derivative element 6*h* serving as a differentiation means; an adder 6*i*; a PWM circuit 6*j*; a timer 6*k*; and an acceleration controller 6*m*.

The rotational position calculator 6*a* detects rising edges and rising edges of the output pulses ENC-A and ENC-B of the rotary encoder 13, counts the number of edges detected, and calculates the rotational position of the PF motor 1 based on that counted value. During the counting, "+1" is added whenever an edge is detected while the PF motor 1 rotates in the forward direction, and "−1" is added whenever an edge is detected while the PF motor 1 rotates in the reverse direction. The periods of each of the pulses ENC-A and ENC-B are equal to the time after a certain slit of the encoding plate 14 for the rotary encoder has passed through the rotary encoder 13 until the next slit passes through the rotary encoder 13. The phases of the pulses ENC-A and ENC-B differ just by 90°. Therefore, the count value "1" of that counting corresponds to ¼ of the slit interval of the encoding plate 14 of the rotary encoder. Thus, by multiplying the above count value by ¼ of the slit interval, the shift amount of the PF motor 1 from a rotational position at which the count value corresponds to "0" can be determined based on the multiplication value. The resolution of the rotary encoder 13 is, in this case, ¼ of the slit interval of the encoding plate 14 of the rotary encoder.

The subtractor 6*b* calculates the deviation of rotational positions between the target rotational position sent from the CPU 16 and the actual rotational position of the PF motor 1 obtained by the rotational position calculator 6*a*.

The target rotation speed calculator 6*c* calculates the target rotation speed of the PF motor 1 based on the rotation position deviation output by the subtractor 6*b*. This calculation is performed by multiplying a gain KP to the rotation position deviation. This gain KP is determined in accordance with the rotation position deviation. It is to be noted that values of the gain KP may be stored in a table not shown in the figure.

The rotation speed calculator 6*d* calculates the rotation speed of the PF motor 1 based on the output pulses ENC-A and ENC-B from the rotary encoder 13. First, rising edges and falling edges of the output pulses ENC-A and ENC-B from the rotary encoder 13 are detected, and the time intervals between the edges, which correspond to ¼ of the slit interval of the encoding plate 14 for the rotary encoder, are counted by a timer counter. The rotation speed of the PF motor 1 is then determined from this count value, the slit interval of the encoding plate 14 for the rotary encoder, and the gear-down ratio between the PF motor 1 and the paper-feed roller 65.

The subtractor 6*e* calculates the deviation between the target rotation speed and the actual rotation speed of the PF motor 1 that has been calculated by the rotation speed calculator 6*d*. The proportional element 6*f* multiplies this deviation with a constant Gp and outputs the multiplication result. The integral element 6*g* integrates the products of the deviation and a constant Gi and outputs the integration result. The derivative element 6*h* multiplies the difference between the current deviation and the previous deviation with a constant Gd and outputs the multiplication result. The calculations of the proportional element 6*f*, the integral element 6*g*, and the derivative element 6*h* are carried out for every period of the output pulse ENC-A of the rotary encoder 13, for example, in synchronization with the rising edge of the output pulse ENC-A.

The values of the signals that are output by the proportional element 6*f*, the integral element 6*g*, and the derivative element 6*h* indicate the duty DX corresponding to the respective calculation results. Here, the duty DX indicates that the duty percentage is (100×DX/2000) %. In that case, if DX=2000, then a duty of 100% is indicated, and if DX=1000, then a duty of 50% is indicated.

The outputs of the proportional element 6*f*, the integral element 6*g* and the derivative element 6*h* are added in the adder 6*i*. The result of the addition is sent as the duty signal to the PWM circuit 6*j* that generates a command signal in accordance with the result of the addition. Based on this command signal having been generated, the PF motor 1 is driven by the driver 2.

Further, the timer 6*k* and the acceleration controller 6*m* are used for controlling the acceleration of the PF motor 1, whereas PID control using the proportional element 6*f*, the integral element 6*g*, and the derivative element 6*h* is used for constant speed control and deceleration control following the acceleration control.

The timer 6*k* generates a timer interrupt signal at predetermined time intervals in response to a clock signal sent from the CPU 16.

The acceleration controller 6*m* successively adds a predetermined duty DXP (for example DXP=200) every time it receives the timer interrupt signal, and results of this successive addition are sent to the PWM circuit 6*j* as the duty signal. Similarly to PID control, the PWM circuit 6*j* generates a command signal corresponding to the result of successive addition, and the PF motor 1 is driven by the driver 2 according to this generated command signal.

The driver 2 includes four transistors, for example, and it applies a voltage to the PF motor 1 by turning those transistors ON or OFF in accordance with the output from the PWM circuit 6*j*.

===Outline of the Operation of the DC Unit===

Figure 8:
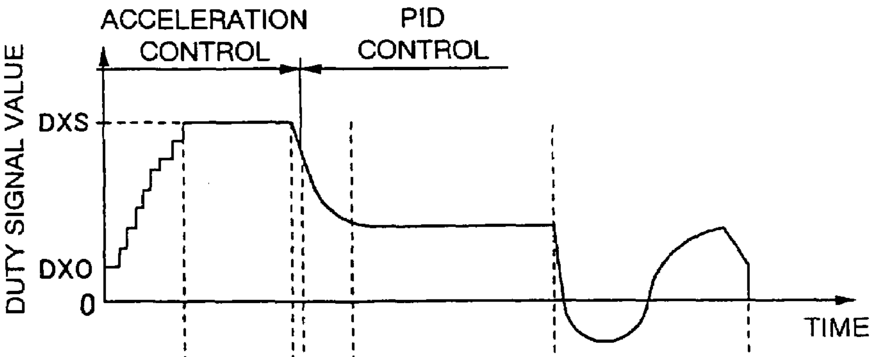
FIG. 8(*a*) is a graph showing the duty signal value sent to the PWM circuit 6*j* of the PF motor 1 controlled by the DC unit 6.
Figure 8:
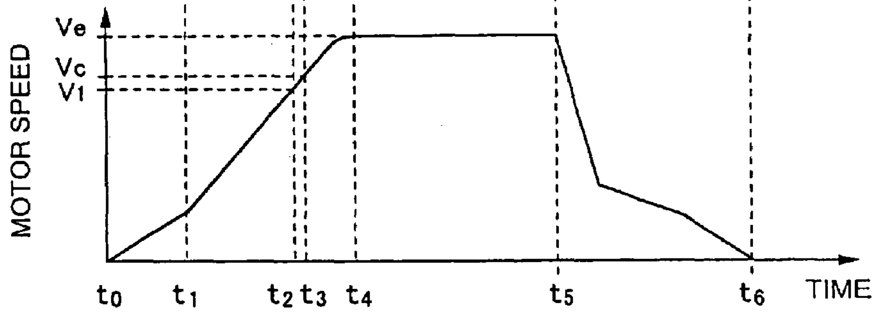

Next, an overview of the operation of the DC unit 6, that is, an overview of a motor control method will be explained with reference to FIGS. 8(*a*) and 8(*b*). FIG. 8 shows graphs of the duty signal value sent to the PWM circuit 6*j* of the PF motor 1 controlled by the DC unit 6, and of the motor rotation speed.

When a start-up command signal for starting the PF motor 1 is sent from the CPU 16 to the DC unit 6 while the PF motor 1 is halted, a start-up initialization duty signal, whose signal value is DX0, is sent from the acceleration controller 6*m* to the PWM circuit 6*j*. This start-up initialization duty signal is sent together with the start-up command signal from the CPU 16 to the acceleration controller 6*m*. Then, this start-up initialization duty signal is converted by the PWM circuit 6*j* into a command signal corresponding to the signal value DX0 and sent to the driver 2, which in turn starts the PF motor 1 (see FIGS. 8(*a*) and 8(*b*)).

After the start-up command signal has been received, a timer interrupt signal is generated by the timer 6*k* at every predetermined time interval. The acceleration controller 6*m* successively adds a predetermined duty DXP (for example, DXP=200) to the duty value DX0 of the start-up initialization duty signal every time it receives the timer interrupt signal, and sends, to the PWM circuit 6*j*, the duty signal whose signal value is the successively added duty. Then, this duty signal is converted by the PWM circuit 6*j* into a command signal corresponding to that signal value and sent to the driver 2. The PF motor 1 is driven by the driver 2 based on the sent command signal, and the rotation speed of the PF motor 1 increases (see FIG. 8(*b*)). Therefore, the value of the duty signal that is output from the acceleration controller 6*m* and sent to the PWM circuit 6*j* has a step-like shape as shown in FIG. 8(*a*).

The process of successively adding the duty in the acceleration controller 6*m* is continued until the successively added duty reaches a certain duty DXS. When the successively added duty reaches the predetermined value DXS at time t1, the acceleration controller 6*m* stops its successive addition processing, and then sends, to the PWM circuit 6*j*, a duty signal whose signal value is the prescribed duty DXS (see FIG. 8(*a*)).

Then, in order to prevent the rotation speed of the PF motor 1 from overshooting, when the PF motor 1 reaches a predetermined rotation speed V1 (see time t2), the acceleration controller 6*m* is controlled so as to reduce the duty percentage of the voltage applied to the PF motor 1. At that time, the rotation speed of the PF motor 1 increases further, but when the rotation speed of the PF motor 1 reaches a predetermined rotation speed Vc (see time t3 in FIG. 8(*b*)), the PWM circuit 6*j* selects the output of the PID control system, that is, the output of the adder 6*i*, and PID control is performed.

At the time at which PID control is started, the integration value of the integral element 6*g* is set to a predetermined value, so that the output value of the integral element 6*g* takes on a predetermined value. This aspect will be explained below.

When the PID control is started, the target rotation speed is calculated from the deviation in rotation position between the target rotation position and the actual rotation position that is obtained from the output of the rotary encoder 13; and based on the deviation in rotation speed between this target rotation speed and the actual rotation speed obtained from the output of the rotary encoder 13, the proportional element 6*f*, the integral element 6*g* and the derivative element 6*h* respectively perform a proportional, integration and differentiation calculation. Accordingly, the control of the PF motor 1 is effected based on the sum of their calculation results. It should be noted that the above-mentioned proportional, integration and differentiation calculations are carried out in synchronization with, for example, the rising edges of the output pulse ENC-A of the rotary encoder 13. Thus, the rotation speed of the PF motor 1 is controlled to have a desired rotation speed Ve.

When the PF motor 1 approaches the target rotation position (see time t5 in FIG. 8(*b*)), the rotation position deviation becomes small, and therefore, the target rotation speed also becomes small. Therefore, the rotation speed deviation, that is, the output of the subtractor 6*e*, becomes negative, the PF motor 1 slows down, and it halts at the time t6.

===Execution Timing of the PF Measurement===

Next, explanation will be made of the execution timing of the PF measurement, with reference to the drawings.

Figure 9:
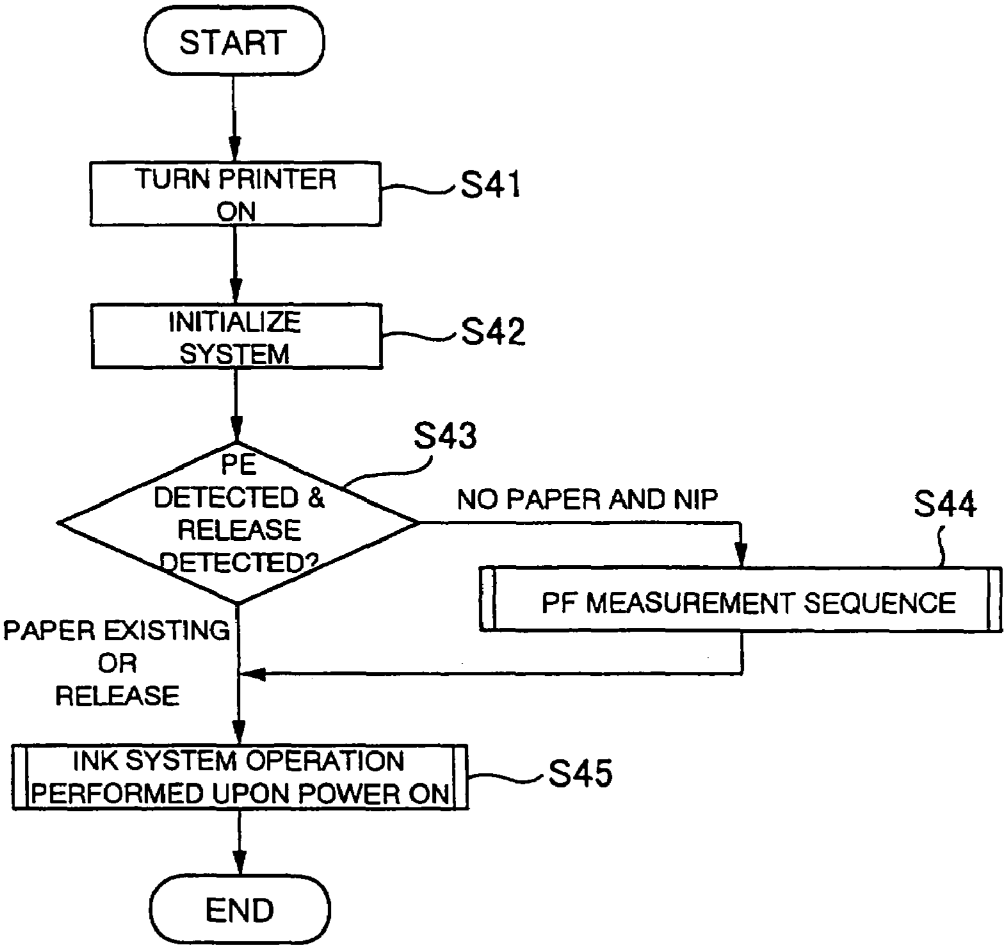

FIG. 9 is a flowchart illustrating the ordinary operation of a printer control device when the power is turned ON, that is, a flowchart illustrating the procedure of an ordinary printer control method when the power is turned ON.

When the power of the printer is turned on (Step S41), the operation of the carriage driving mechanism and the paper-feed mechanism when the power is turned ON, that is, a system initialization operation is carried out (Step S42).

After the system initialization, a paper end (PE) detection and a release detection are carried out (Step S43). The PE detection is performed by the paper detection sensor 15. The PE detection has conventionally been for detecting the lower end of the printing paper, but here, it is performed in order to detect whether or not there is printing paper in the paper-feed mechanism. This is because the PF measurement has to be performed in a state in which no paper is inserted into the paper-feed mechanism, that is, in a state in which the paper-feed mechanism is empty.

The release detection is performed in order to detect whether the paper-feed mechanism is in a nip state which is for feeding printing paper whose thickness is within a predetermined region, or whether the paper-feed mechanism is in a release state which is for feeding printing paper whose thickness exceeds that predetermined region. The PF measurement is for measuring the output value of the integral element 6*g* corresponding to the paper-feed driving load and the motor rotation speed when the paper-feed mechanism is in the nip state and empty. However, when the paper-feed mechanism is in the release state, for example, in order to feed thick paper, then the gap of the printing paper holder of the paper-feed mechanism is in a widened state. For this reason, if PF measurement is performed while the paper-feed mechanism is in the release state, then an output value of the integral element 6*g* will be measured that corresponds to a paper-feed driving load that is smaller than the paper-feed driving load in the nip state, and the original purpose cannot be achieved.

Consequently, if, as the result of the PE detection and the release detection, it is detected that there is printing paper in the paper-feed mechanism, or if it is detected that the paper-feed mechanism is in the release state, then no PF measurement will be carried out, and the procedure will advance to the next operation, which is the ink system operation taken when the power is turned ON (Step S45). The ink system operation taken when the power is turned ON is for initializing the ink system including the head to a printing enabled state.

On the other hand, if, as the result of the PE detection and the release detection, it is detected that there is no printing paper in the paper-feed mechanism and the paper-feed mechanism is in the nip state, then the PF measurement will be carried out in accordance with a predetermined sequence (step S44). The detailed operation and procedure of the PF measurement will further be explained below.

After the PF measurement is finished, the procedure advances to the next operation, which is the ink system operation taken when the power is turned ON (Step S45).

The foregoing is the operation and procedure when the power has been turned ON in an ordinary manner. However, whether or not to perform the system initialization operation and the ink system operation and how to configure their details are optional. This means that when the power has been turned ON in an ordinary manner, PE detection and release detection are performed, and the PF measurement is carried out in accordance with the detection results.

In the foregoing explanations, the PF measurement is carried out when the power is turned ON, but other than upon power ON, it is also possible to perform the PF measurement upon ink cartridge exchanges or upon roll paper exchanges, and it is further possible to set various conditions and carry out the PF measurement in accordance with those set conditions. For example, it is possible to provide a temperature sensor and carry out the PF measurement in accordance with temperature fluctuations.

===Detailed Operation and Procedure of the PF Measurement===

Next, explanation will be made of the detailed operation and the procedure of the PF measurement.

Figure 10:
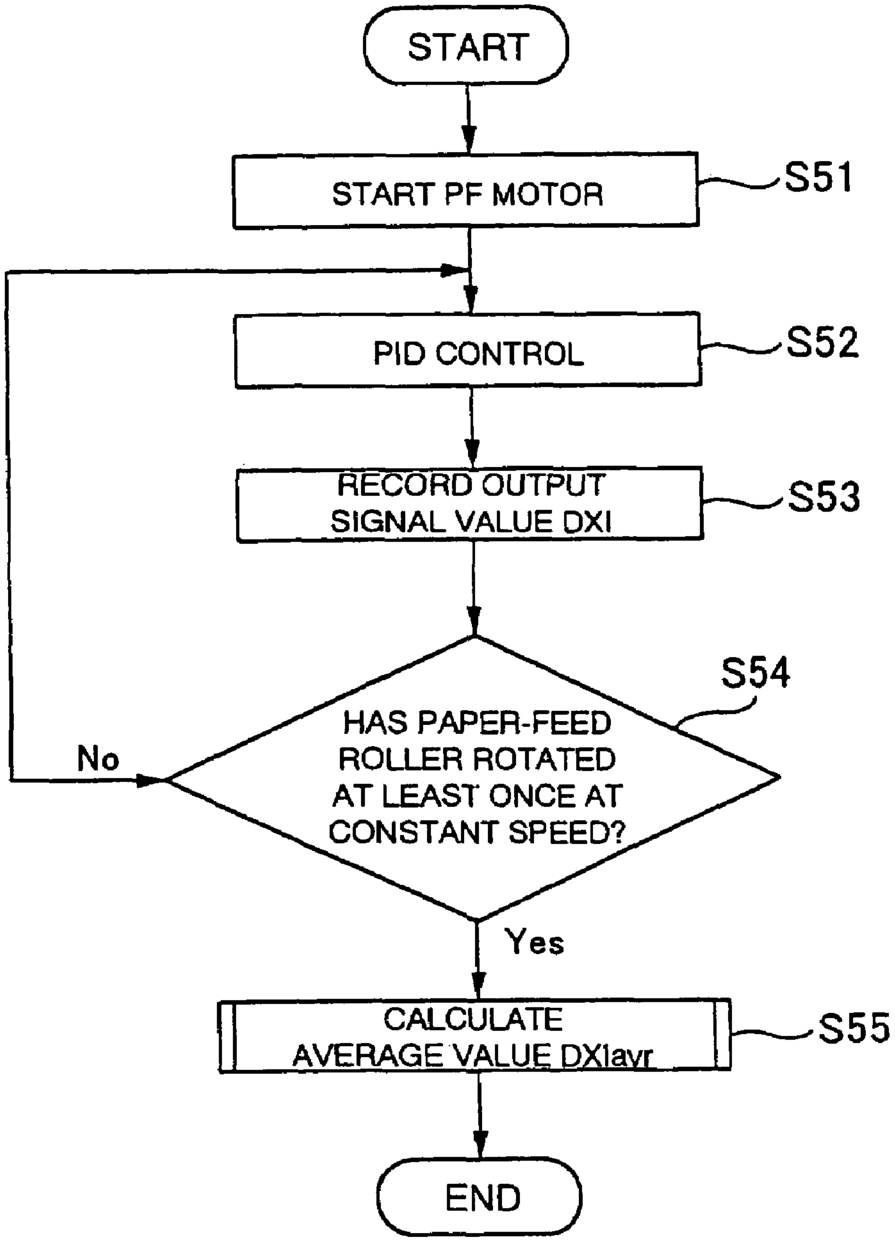
FIG. 10 is a flowchart for explaining the procedure of the PF measurement.
Figure 11:
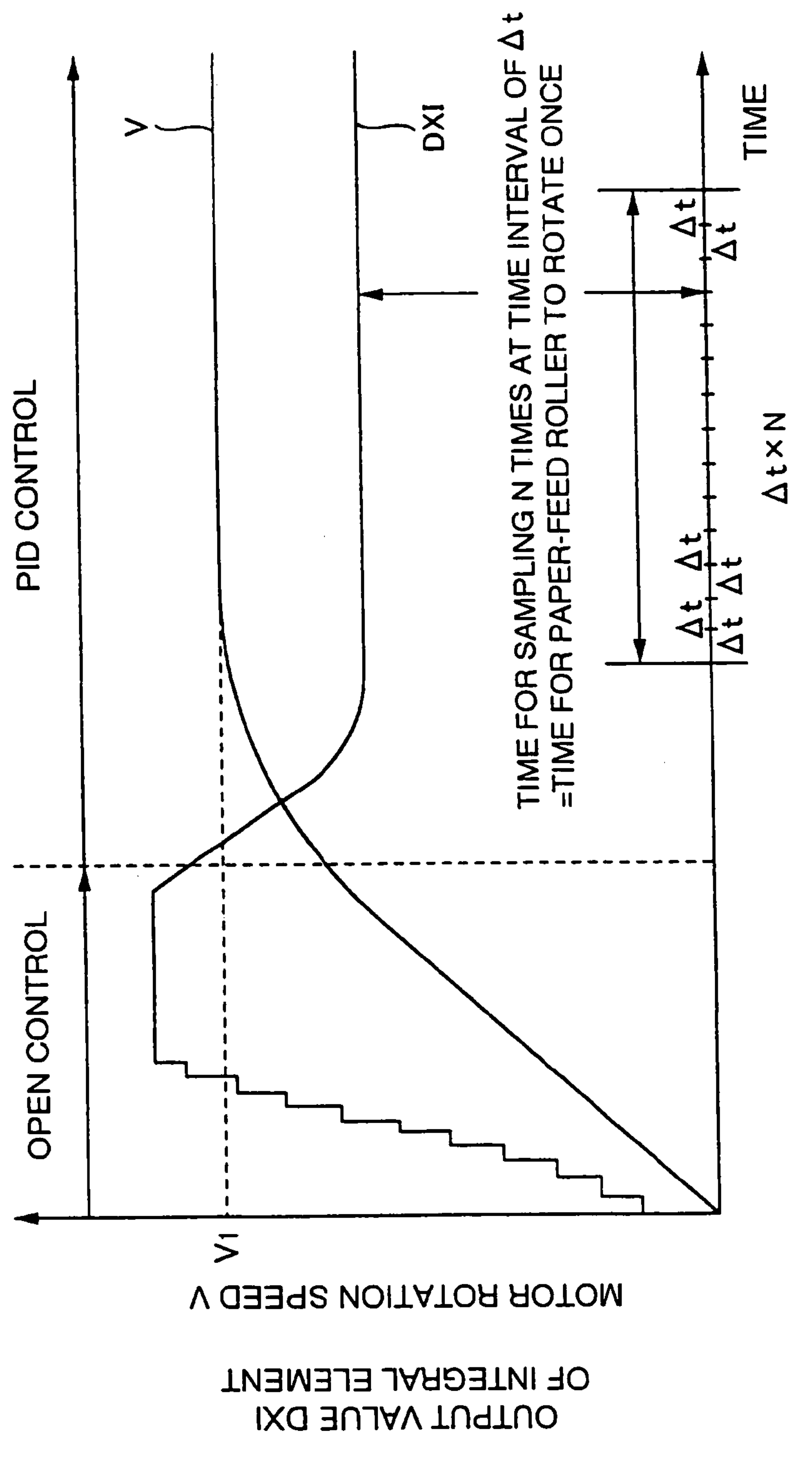
FIG. 11 is a graph showing the, motor rotation speed and the integral element output values during PF measurement.

FIG. 10 is a flowchart illustrating the operation of the PF measurement, that is, the procedure for the PF measurement. FIG. 11 is a graph showing the motor rotation speed and the integral element output values during PF measurement.

The PF measurement is carried out as follows. First, the paper-feed motor is started (Step S51), acceleration control is carried out by open loop control, and the paper-feed motor is accelerated until the rotation speed V of the motor approaches a predetermined rotation speed V1.

When the motor rotation speed V approaches the predetermined target rotation speed V1, the control is caused to transition from open loop control to PID control (Step S52), and constant rotation speed driving is performed at the target rotation speed V1. While constant rotation speed driving is performed with PID control, the value DXI of the output signal of the integral element 6*g* takes on a substantially constant value, as shown in the graph in FIG. 11.

When the difference between the rotation speed V and the target rotation speed V1 of the motor becomes equal to or drops below a predetermined value, and the output signal value DXI of the integral element 6g takes on a substantially constant value, the recording of the output signal value DXI, that is, the sampling of the time interval At of the output signal value DXI is started (Step S53). For example, the recording of the output signal value DXI starts after the paper-feed roller has started to be driven by PID control at the constant rotation speed, and continues from when the sampling of the output signal value DXI has been started until when the paper-feed roller has rotated for at least one revolution, and the recording of the output signal value DXI is terminated when the paper-feed roller has rotated for one revolution (Step S54). The number of revolutions of the motor corresponding to the period during which the output signal value DXI is to be recorded can be set as appropriate in accordance with the time interval in sampling the output signal value DXI and the number times for sampling. Here, in a case where, for example, N times of sampling are to be performed at a time interval Δt, and if the time for performing N times of sampling at the time interval Δt and the time during which the paper-feed roller rotates over one revolution are the same as shown in FIG. 11, then the output signal value DXI should be sampled at the time interval Δt and each of the output signal values should be recorded from the time when the paper-feed roller has started to be driven at constant rotation speed until the paper-feed roller has rotated for one revolution.

During the time period in which the output signal value DXI is being recorded, whenever a sampling is performed at the time interval Δt, an integration value is calculated from each of the output signal values DXI and the time interval Δt of the sampling, and stored.

After the paper-feed roller has rotated for one revolution after starting to be driven at a constant rotation speed and the recording of the output signal value has been terminated by performing N times of sampling for the output signal value DXI at the time interval Δt, then the sum of the N pieces of integration values of the output signal value DXI is calculated, and, by dividing the above-mentioned sum by the length of the recording time Δt×N, an average value DXIavr1 of the output signal of the integral element is calculated, the value DXIavr1 corresponding to the driving load and the target rotation speed V1 of the paper-feed motor during constant rotation speed driving at the target rotation speed V1 (Step S55).

Next, the processes of Step S51, Step S52, Step S53, Step S54 and Step S55 are carried out similarly for another target rotation speed V2 that is different from the target rotation speed V1, and an average value DXIavr2 of the output signal of the integral element is calculated, the value DXIavr2 corresponding to the driving load and the target rotation speed V2 of the paper-feed motor during constant rotation speed driving at the target rotation speed V2.

With the foregoing, the PF measurement is terminated. The average value DXIavr1 of the output signal of the integral element 6g corresponding to the target rotation speed V1 and the average value DXIavr2 of the output signal of the integral element 6g corresponding to the target rotation speed V2 obtained with this PF measurement are stored in a predetermined memory.

===Output Value of Integral Element at Start of PID Control===

Figure 12:
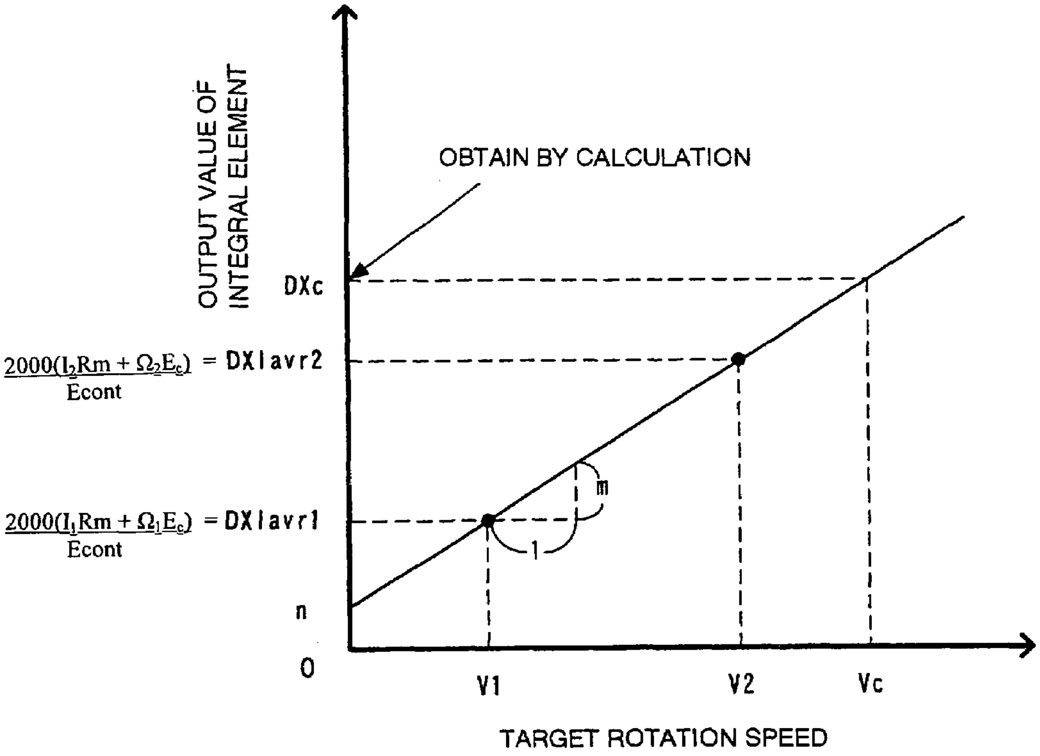
FIG. 12 is a diagram showing the relation between the target rotation speed of the PF motor 1 and the output value of the integral element 6*g*.
Figure 13:
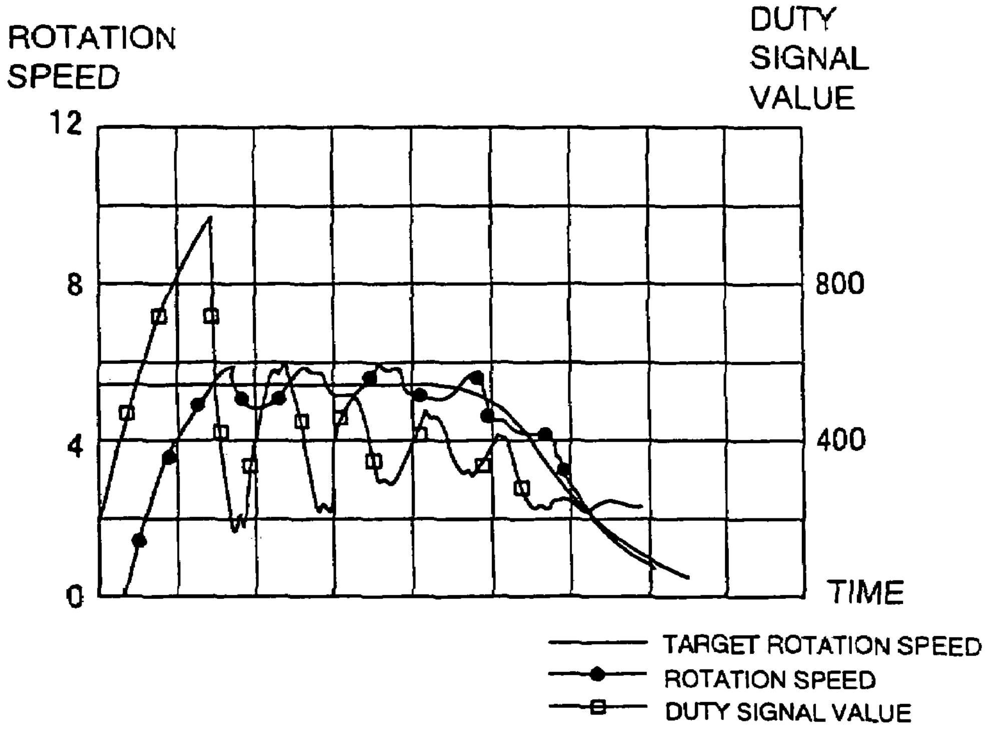
In FIG. 13, FIG. 13(*a*) is a diagram for explaining the control characteristics for the case where the output value of the integral element 6*g* has not been set to a value obtained by calculation.
Figure 13:
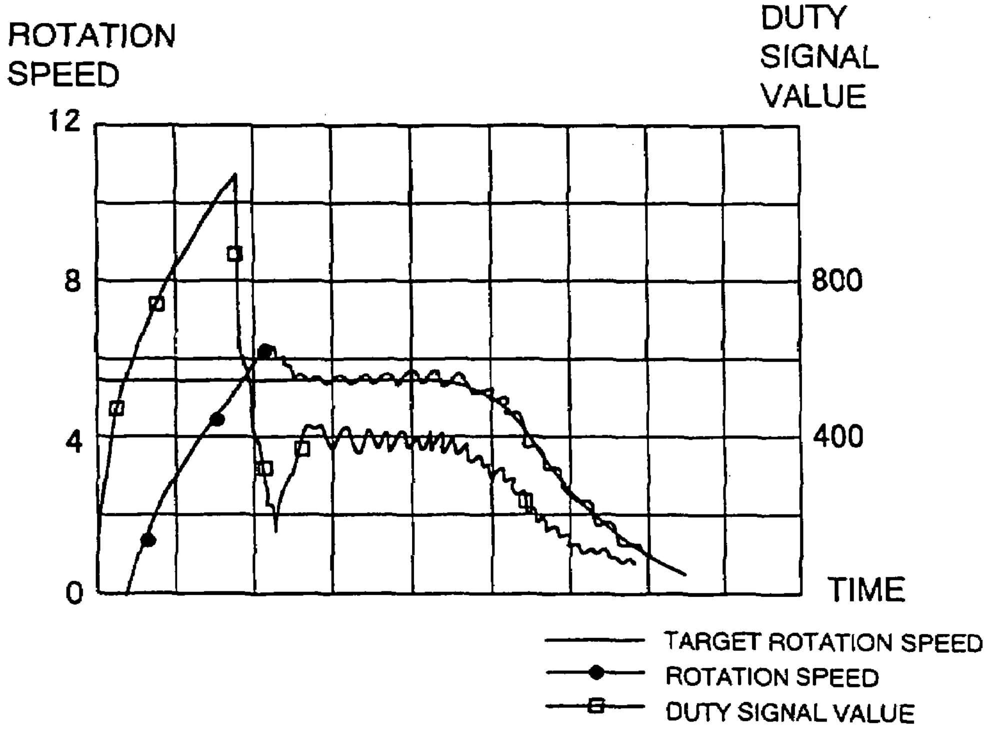

Next, referring to the drawings, explanation will be made of a method for setting the output value of the integral element 6g at the time when the PID control begins. FIG. 12 is a diagram showing the relation between the target rotation speed of the PF motor 1 and the output value of the integral element 6g. FIG. 13(a) and FIG. 13(b) are diagrams illustrating control characteristics.

The average values DXIavr of the output signal of the integrated element 6g obtained by the PF measurement take on values that differ depending on the target rotation speed during when the PF motor 1 is driven at constant rotation speed. This aspect is explained below.

When Econt is the constant voltage applied to the PF motor 1, Rm is the resistance of the PF motor 1, I is the current that flows through the PF motor 1, DXIavr is the average value of the output of the integral element 6g, Ω is the rotation speed of the PF motor 1, Ec is the counter electromotive voltage coefficient of the motor, Kt is the motor torque constant, and 2000 is the integral element output value indicating a duty percentage of 100%, then the following relation holds:

$$Kt \times I = Kt \times (DXIavr \times Econt/2000 - \Omega \times Ec)/Rm$$

It should be noted that the output values of the proportional element 6f and the derivative element 6h have been set to zero. Furthermore, Ω×Ec is the counter electromotive voltage generated in the PF motor 1 when the PF motor 1 rotates at the rotation speed Ω, and the larger the rotation speed Ω becomes, the larger becomes this value.

Here, Econt, Ec, Rm and Kt are constants, and Kt×I takes on a predetermined value corresponding to the load torque acting on the PF motor 1 when the PF motor 1 rotates at a predetermined rotation speed. Consequently, if the load torque acting on the PF motor 1 is the same, the left side (Kt×I) in the above equation will also stay the same. Therefore, if the rotation speed Ω of the PF motor 1 differs, so will the average value DXIavr of the output of the integral element 6g.

Now, in this embodiment, the output value DXc of the integral element 6g at the time when the PID control begins is set using the average value DXIavr1 of the output signal of the integral element 6g corresponding to the target rotation speed V1 and the average value DXIavr2 of the output signal of the integral element 6g corresponding to the target rotation speed V2, which have been obtained by the PF measurement and stored in a predetermined memory.

When Vc is the rotation speed of the motor 1 at the time when the PID control begins, then DXc can be determined by the following equation (see FIG. 12):

DXc=m×Vc+n, wherein the slope m and the intercept n are determined from the following equations:

$$m = (DXIavr1 - DXIavr2)/(V1 - V2)$$

$$n = (V1 \times DXIavr2 - V2 \times DXIavr1)/(V1 - V2)$$

Next, the duty signal value, which corresponds to the paper-feed driving load caused only by the existence of the printing paper and stored as the offset value in the same or a different memory, is added to DXc, and the output value of the integral element 6g at the time when the PID control was started is set to the value obtained as a result for the above. Thus, the output value of the integral element 6g at the time when the PID control was started will be set as the value corresponding to the counter electromotive force generated by the PF motor 1 due to its rotation.

FIG. 13(a) shows the control characteristics for the case where the output value of the integral element 6g is not set to the value determined by the above calculation, and FIG. 13(b) shows the control characteristics for the case where the output value of the integral element 6g is set to the value determined by the above calculation. As it is clear from FIG. 13(a) and FIG. 13(b), if the output value of the integral element 6g is not set at the time when the PID control is started to the value determined by the above calculation, then more time will be needed until the rotation speed follows the target rotation speed. Conversely, when the output value of the integral element 6*g* is set at the time when the PID control is started to the value determined by the above calculation, then only a short amount of time is needed until the rotation speed follows the target rotation speed.

It should be noted that when the PF motor 1 rotates at a relatively fast speed, then the time from starting the PID control until the PF motor 1 is halted is relatively long; therefore, a very precise position control of the PF motor 1 is possible with the PID control system. By contrast, when the PF motor 1 rotates at a relatively slow speed, the PF motor 1 will be halted soon after the PID control begins; therefore, if the output value of the integral element 6*g* at the start of the PID control is not suitably set, then there is the possibility that the positioning precision may drop. Consequently, if the maximum rotation speed of the PF motor 1 is set to VMAX, then it is preferable that the target rotation speeds V1 and V2 fulfill the relations 0<V1≦(2×VMAX/3) and 0<V2≦(2×VMAX/3).

Furthermore, in the PF measurement as explained above, the average values DXIavr1 and DXIavr2 of the output signals of the integral element 6*g* were determined for two different target rotation speeds V1 and V2, and the output value of the integral element 6*g* at the time when the PID control is started was set based thereon. However, it is also possible to determine, with the PF measurement, the average value of the output signals of the integral element 6*g* for three or more different target rotation speeds, and set the output value of the integral element 6*g* at the time when the PID control is started based thereon.

Furthermore, the foregoing was an explanation for the case where the PF motor 1 is controlled, but the same control method can also be applied to the CR motor 4.

===Determination of Control Constants During Acceleration Control===

Figure 14:
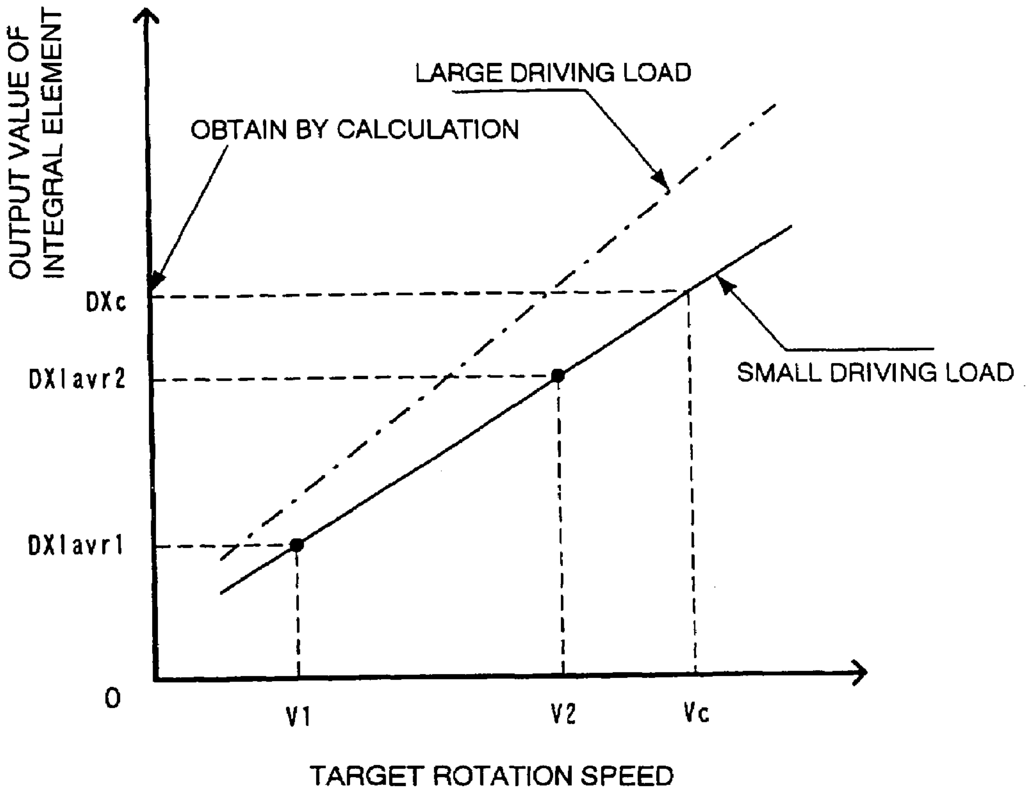
FIG. 14 is a diagram showing the relation between the target rotation speed of the PF motor 1 and the output value of the integral element 6*g*, depending on the driving load.

Referring to the drawings, next, explanation will be made of how the control constants during acceleration control are determined. FIG. 14 is a diagram showing the relation between the target rotation speed of the PF motor 1 and the output value of the integral element 6*g*, depending on the driving load.

The average values DXIavr1 and DXIavr2 of the output signals of the integral element 6*g* obtained by the PF measurement become larger as the driving load of the PF motor 1 becomes larger (see FIG. 14). Consequently, the average values DXIavr1 and DXIavr2 of the output signals of the integral element 6*g* are an indicator of the amount of the driving load of the PF motor 1.

Thus, in this embodiment, the control constants during acceleration control are determined using the average values DXIavr1 and DXIavr2 of the output signals of the integral element 6*g*.

Even when the driving load of the PF motor 1 is the same, for different target rotation speeds when driving the PF motor 1 at constant rotation-speed, the average value DXIavr of the output signal of the integral element 6*g* obtained by the PF measurement will have different values. This aspect is explained first.

When Econt is the constant voltage applied to the PF motor 1, Rm is the resistance of the PF motor 1, I is the current that flows through the PF motor 1, DXIavr is the average value of the output of the integral element 6*g*, Ω is the rotation speed of the PF motor 1, Ec is the counter electromotive voltage coefficient of the motor, Kt is the motor torque constant, and 2000 is the integral element output value indicating a duty percentage of 100%, then the following relation holds:

$$Kt \times I = Kt \times (DXIavr \times Econt/2000 - \Omega \times Ec)/Rm$$

It should be noted that the output values of the proportional element 6*f* and the derivative element 6*h* have been set to zero. Furthermore, Ω×Ec is the counter electromotive voltage generated in the PF motor 1 when the PF motor 1 rotates at the rotation speed Ω, and the larger the rotation speed Ω becomes, the larger becomes this value.

Here, Econt, Ec, Rm and Kt are constants, and Kt×I takes on a predetermined value corresponding to the load torque acting on the PF motor 1 when the PF motor 1 rotates at a predetermined rotation speed. Consequently, if the load torque acting on the PF motor 1 is the same, the left side (Kt×I) in the above equation will also stay the same. Therefore, if the rotation speed Ω of the PF motor 1 differs, so will the average value DXIavr of the output of the integral element 6*g*.

Now, in this embodiment, the control constants used during acceleration control will be determined using the average value DXIavr1 of the output signal of the integral element 6*g* corresponding to the target rotation speed V1 and the average value DXIavr2 of the output signal of the integral element 6*g* corresponding to the target rotation speed V2, which have been obtained by the PF measurement and stored in a predetermined memory.

As control constants, there are the start-up initialization duty signal value DX0 and the predetermined duty DXP, and at least one of these is to be set. This setting method is explained in further detail.

When Vc is the target rotation speed that should be attained by the PF motor 1 by acceleration control and PID control following thereafter, the output signal value DXc of the integral element 6*g* corresponding to Vc can be determined by the following equation (see FIG. 14):

DXc=m×Vc+n, wherein the slope m and the intercept n are determined from the following equations:

$$m = (DXIavr1 - DXIavr2)/(V1 - V2)$$

$$n = (V1 \times DXIavr2 - V2 \times DXIavr1)/(V1 - V2)$$

If the start-up initialization duty signal value DX0 used during acceleration control is to be determined in accordance with the driving load of the PF motor 1, then this DX0 will be set to a value in accordance with the output signal value DXc of the integral element 6*g* corresponding to the afore-mentioned Vc. This means that, taking KX as a positive proportional constant, DX0=KX×DXc.

Furthermore, if the predetermined duty DXP is to be determined in accordance with the driving load of the PF motor 1, then this DXP will be set to a value in accordance with the output signal value DXc of the integral element 6*g* corresponding to the afore-mentioned Vc. This means that, taking KY as a positive proportional constant, DXP=KY×DXc.

Thus, at least one of the control constants during acceleration control, DX0 and DXP, will be set in accordance with the driving load of the PF motor 1. More precisely, at least one of DX0 and DXP will be set to have a larger value as the amount of the driving load of the PF motor 1 gets larger.

Furthermore, the foregoing was an explanation for the case that the PF motor 1 is controlled, but the same control method can also be applied to the CR motor 4.

===Modified Example of Acceleration Control===

Figure 15:
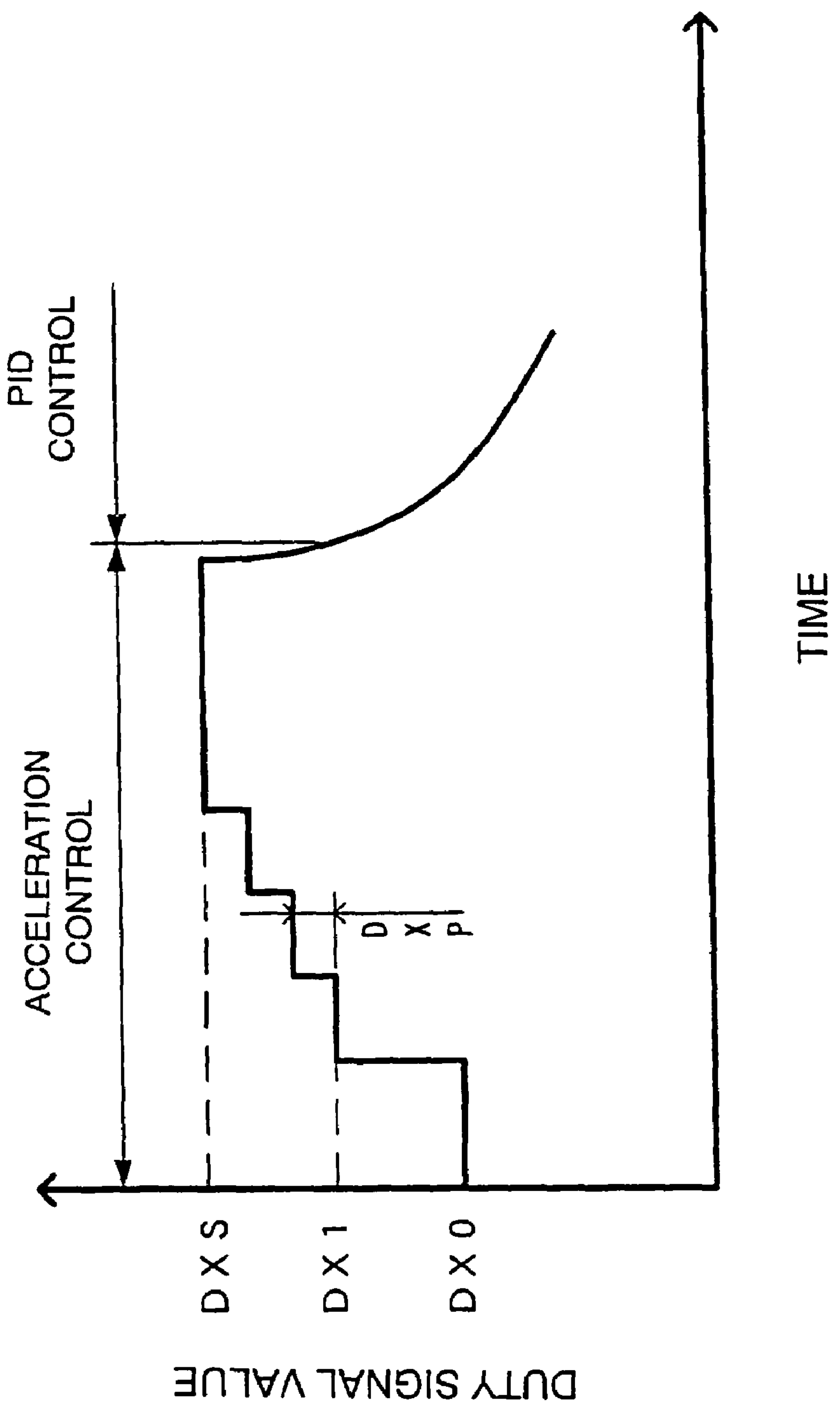
FIG. 15 is a diagram for explaining a modified example of the acceleration control.

Referring to the drawings, next, explanation will be made of a modified example of the acceleration control. FIG. 15 is a diagram illustrating this modified example of the acceleration control.

This modified example is different from the preceding embodiment in an aspect where, during the acceleration control, the driving of the motor is started with an initial driving signal that causes a gear provided on the motor shaft to abut against an engaged gear that engages the above-mentioned gear, and after the motor has been driven by a driving signal having a signal value that is larger than the initial driving signal, the motor is sequentially driven by a driving signal obtained by successively adding a predetermined value to that signal value and taking that value, which has been obtained as a result of successive addition, as the signal value, thus increasing the motor's rotation speed.

As shown in FIG. 6, on the motor shaft of the PF motor 1*a*, there is provided a small gear 87, and this small gear 87 engages a large gear 67*a* serving as the engaged gear. Consequently, there is a backlash between the small gear 87 and the large gear 67*a*.

In this embodiment, first, when a start-up command signal for starting the PF motor 1 is sent from the CPU 16 to the DC unit 6 while the PF motor 1 is halted, a start-up initialization duty signal, whose signal value is DX0, is sent from the acceleration controller 6*m* to the PWM circuit 6*j*. This start-up initialization duty signal is sent, together with a start-up command signal, from the CPU 16 to the acceleration controller 6*m*. The start-up initialization duty signal is converted by the PWM circuit 6*j* into a command signal corresponding to the signal value DX0 and sent to the driver 2, and the start-up of the PF motor 1 is initiated by the driver 2. Here, the start-up initialization duty signal value DX0 is set to such a value that the small gear 87 abuts against the large gear 67*a* and the large gear 67*a* does not move. Consequently, even when the teeth of the small gear 97 do not abut against the teeth of the large gear 67*a* due to the backlash between the small gear 87 and the large gear 67*a*, the teeth of the small gear 87 and the teeth of the large gear 67*a* can be made to contact reliably.

Next, as shown in FIG. 15, a duty signal whose signal value is DX1 is sent from the acceleration controller 6*m* to the PWM circuit 6*j*. The duty signal is converted by the PWM circuit 6*j* into a command signal corresponding to the signal value DX1 and sent to the driver 2, and the PF motor 1 is driven by the driver 2. Here, the duty signal value DX1 is set to a value that is slightly smaller than a limit value at which the large gear 67*a* does not move.

Thereafter, the acceleration controller 6*m* will successively add a predetermined duty DXP to the duty signal value DX1 every time it receives a timer interrupt signal, and sends, to the PWM circuit 6*j*, a duty signal whose signal value is the successively added duty. This duty signal is converted by the PWM circuit 6*j* into a command signal corresponding to its signal value and is sent to the driver 2. Based on the sent command signal, the PF motor 1 is driven by the driver 2, and the rotation speed of the PF motor 1 increases (see FIG. 15).

The process of successively adding the duty in the acceleration controller 6*m* is continued until the successively added duty reaches a certain duty DXS. When the successively added duty reaches the predetermined value DXS, the acceleration controller 6*m* stops its successive addition processing, and thereafter sends, to the PWM circuit 6*j*, a duty signal whose signal value is the prescribed duty DXS (see FIG. 14).

Then, in order to prevent the rotation speed of the PF motor 1 from overshooting, when the PF motor 1 reaches a predetermined rotation speed V1, the acceleration controller 6*m* carries out control so as to reduce the duty percentage of the voltage applied to the PF motor 1. At that time, the rotation speed of the PF motor 1 further increases, but when the rotation speed of the PF motor 1 reaches a predetermined rotation speed Vc, the PWM circuit 6*j* will select the output of the PID control system, that is, the output of the adder 6*i*, and PID control will be effected in a similar manner as in the afore-described embodiment.

Here, in this embodiment, at least one of the above-mentioned DX0, DX1, and DXP is set using the average value DXIavr1 of the output signal of the integral element 6*g* corresponding to the target rotation speed V1, and the average value DXIavr2 of the output signal of the integral element 6*g* corresponding to the target rotation speed V2, which have been obtained by the PF measurement and stored in a predetermined memory.

Upon setting, when Vc is the target rotation speed that is to be attained by the PF motor 1 by acceleration control and PID control following thereafter, the output signal value DXc of the integral element 6*g* corresponding to Vc will be determined by the procedure explained above.

The method for determining, in accordance with the driving load of the PF motor 1, the start-up initialization duty signal value DX0 used during acceleration control, and the method for determining, in accordance with the driving load of the PF motor 1, the predetermined duty DXP are as explained above; and in a case where the duty DX1 is to be determined in accordance with the duty load of the PF motor 1, this DX1 will be set to a value in accordance with the output signal value DXc of the integral element 6*g* corresponding to the above-noted Vc. This means that, taking KZ as a positive proportional constant, DX1=KZ×DXc.

Thus, at least one of the control constants during acceleration control, i.e., DX0, DX1 and DXP, will be set in accordance with the driving load of the PF motor 1. More specifically, at least one of DX0, DX1 and DXP will be set to have a larger value as the amount of the driving load of the PF motor 1 becomes larger.

It should be noted that in the foregoing explanations, DX0, DXP and DX1, which are the control constants during acceleration control, are set using positive constants KX, KY and KZ, but KX, KY and KZ do not necessarily have to be constants, and it is also possible that the control constants are set to suitable values in accordance with the driving load of the PF motor 1.

Furthermore, instead of estimating the driving load of the PF motor 1 using the output signal of the integral element 6*g*, it is also possible to estimate the driving load of the PF motor 1 using the output signal of the adder 6*i*.

Furthermore, there are a variety of methods for actually measuring or estimating the driving load of the PF motor 1; for example, it is also possible to connect, to the PF motor 1, a measurement equipment for measuring driving loads to measure the driving load.

===Countermeasures Against Heating of Motor===

Figure 16:
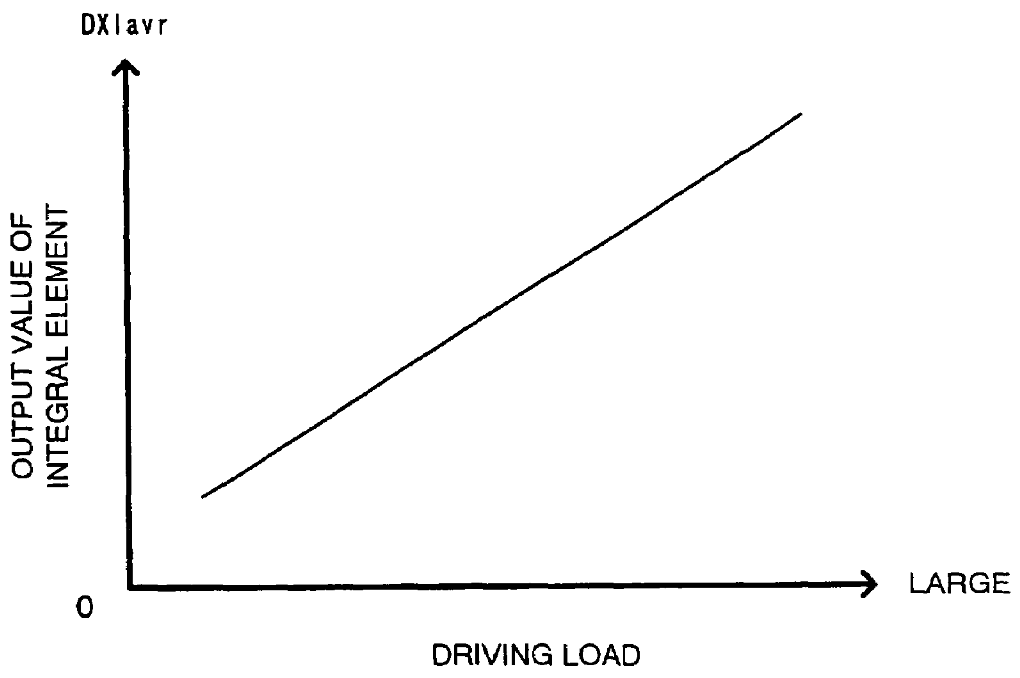
FIG. 16 is a diagram showing the relation between the driving load of the PF motor 1 and the output value of the integral element 6*g*.
Figure 17:
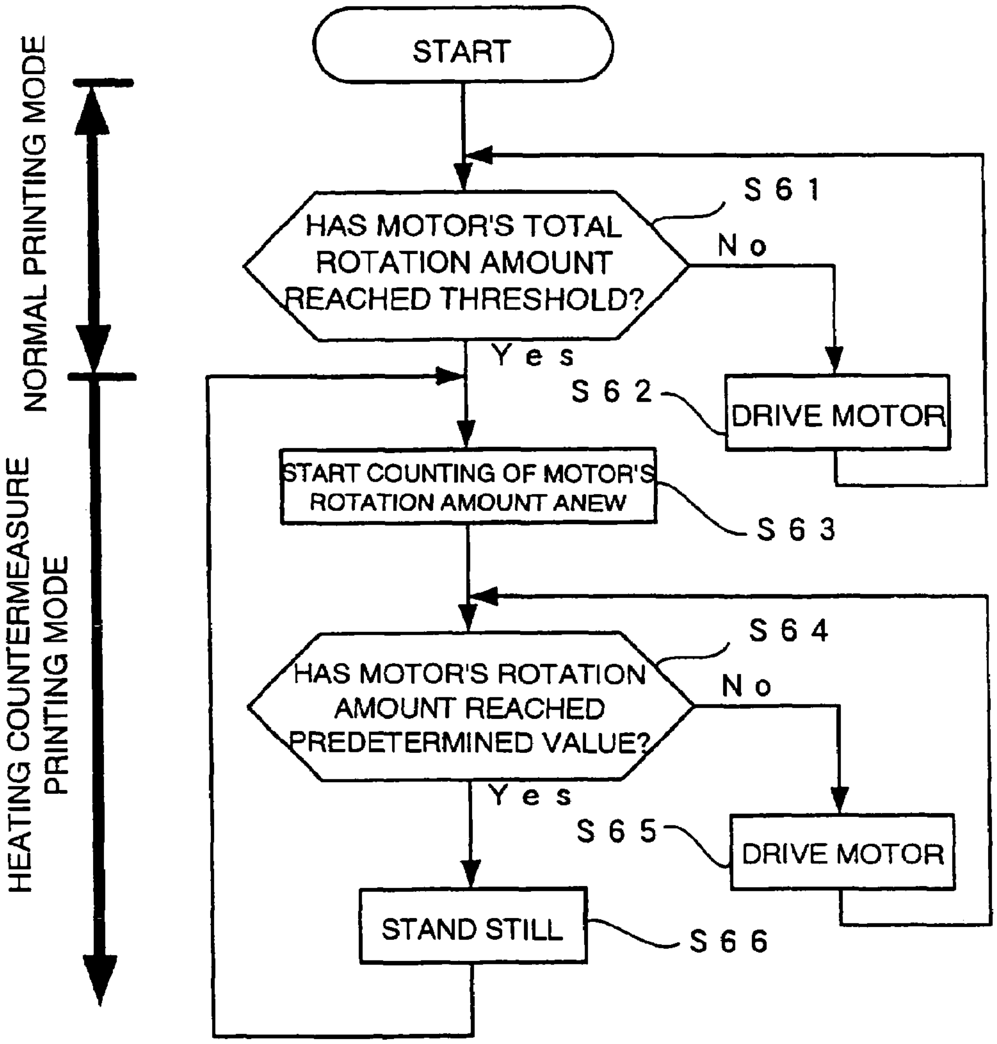
FIG. 17 is a flowchart showing the procedure of a countermeasure against heating of the motor.

Next, referring to the drawings, explanation will be made of a method for driving the PF motor 1 for providing a countermeasure against the heating of the PF motor 1. FIG. 16 is a diagram showing the relation between the driving load of the PF motor 1 and the output value of the integral element 6*g*. FIG. 17 is a flowchart illustrating the procedure of a countermeasure against heating of the motor. FIG. 18 is a diagram showing examples of how conditions are set in accordance with the driving load.

The average value DXIavr of the output signal of the integral element 6*g* obtained by the PF measurement becomes a larger value as the driving load of the PF motor 1 becomes larger (see FIG. 16). Consequently, the average value DXIavr of the output signal of the integral element 6*g* is an indicator of the amount of the driving load of the PF motor 1.

Thus, in this embodiment, a countermeasure against heating of the motor in accordance with the driving load of the PC motor 1 is carried out using the average value DXIavr1 of the output signal of the integral element 6*g*.

As shown in FIG. 17, the printer 60 prints in the normal printing mode until the total rotation amount of the PF motor 1 has reached a threshold, and when the total rotation amount of the PF motor 1 reaches the threshold, it will print in a heating countermeasure mode.

When the printer 60 starts printing, the printer judges, at suitable timings, whether or not the total rotation amount of the PF motor 1 has reached a predetermined threshold (Step S61). If the total rotation amount of the PF motor 1 has not yet reached the predetermined threshold, driving of the PF motor 1 is permitted (Step S62).

If the total rotation amount of the PF motor 1 has reached the predetermined threshold, then the counting of the rotation amount of the PF motor 1 is started over after reaching the threshold (Step S63).

Thereafter, the printer judges whether or not the rotation amount of the PF motor 1, whose count has been started anew, has reached the predetermined value (Step S64). If the rotation amount of the PF motor 1 has not reached the predetermined value, then driving of the PF motor 1 is permitted (Step S65). If the rotation amount of the PF motor 1 has reached the predetermined value, then driving of the PF motor 1 is forcibly caused to stand still for a predetermined period of time (Step S66). After that standstill, the processing of Step S63 to Step S66 is repeated until the printing is finished.

In this embodiment, at least one of the following is set in accordance with the driving load of the PF motor 1: the above-mentioned threshold for judging whether or not to make a transition from the normal printing mode to the heating countermeasure printing mode; the length of the period of standstill to be provided after the transition to the heating countermeasure printing mode; and the rotation amount of the PF motor 1 that is permitted after the standstill period has ended until entering the next standstill period. More specifically, at least one of the threshold, the length of the standstill period, and the rotation amount of the PF motor 1 that is permitted after the standstill period has ended until entering the next standstill period is set in accordance with the average value DXIavr of the output signal of the integral element 6*g* obtained by the PF measurement.

FIG. 18(*a*) shows an example in which the threshold is set in accordance with the average value DXIavr of the output signal of the integral element 6*g* obtained by the PF measurement. When 20≦DXIavr≦80, the driving load of the motor is relatively small, and therefore, the transition to the heating countermeasure printing mode takes place when the total rotation amount of the PF motor 1 reaches 30,000,000 radian; whereas when 80<DXIavr<100, the driving load of the motor is large, and therefore, the transition to the heating countermeasure printing mode takes place when the total rotation amount of the PF motor 1 reaches 20,000,000 radian. That is to say, when the driving load of the PF motor 1 is large, the transition to the heating countermeasure printing mode takes place earlier than when the driving load is small. It should be noted that when 100≦DXIavr, the driving load is extraordinarily large, and therefore, driving of the PF motor 1 is not performed, and the user is alerted by means such as a blinking red message.

FIG. 18(*b*) shows an example in which the length of the standstill period is set in accordance with the average value DXIavr of the output signal of the integral element 6*g* obtained by the PF measurement. When 20≦DXIavr≦80, the driving load of the motor is relatively small, and therefore, the standstill period in the heating countermeasure printing mode is set to 5 seconds, whereas when 80<DXIavr<100, the driving load of the motor is large, and therefore, the standstill period in the heating countermeasure printing mode is set to 10 seconds. That is to say, when the driving load of the PF motor 1 is large, the standstill period is made longer than when the driving load is small. It should be noted that also in this example, when 100≦DXIavr, the driving load is extraordinarily large, and therefore, driving of the PF motor 1 is not performed, and the user is alerted by a means such as a blinking red message.

FIG. 18(*c*) shows an example in which the rotation amount of the PF motor 1 that is permitted after the standstill period is ended until entering the next standstill period (permitted rotation amount) is set in accordance with the average value DXIavr of the output signal of the integral element 6*g* obtained by the PF measurement. When 20≦DXIavr≦80, the driving load of the motor is relatively small, and therefore, the permitted rotation amount is set to 18,000 radian, whereas when 80<DXIavr<100, the driving load of the motor is large, and therefore, the permitted rotation amount is set to 10,000 radian. That is to say, when the driving load of the PF motor 1 is large, the permitted rotation amount is set smaller than when the driving load is small. It should be noted that also in this example, when 100≦DXIavr, the driving load is extraordinarily large, and therefore, driving of the PF motor 1 is not performed, and the user is alerted by a means such as a blinking red message.

In the examples shown in FIG. 18, among the threshold, the length of the standstill period, and the rotation amount of the PF motor 1 that is permitted after the standstill period has ended until entering the next standstill period, one is set in accordance with the average value DXIavr of the output signal of the integral element 6*g* obtained by the PF measurement; however, it is also possible to set two or more of these.

Furthermore, in the examples shown in FIG. 18, the threshold, the length of the standstill period, and the rotation amount of the PF motor 1 that is permitted after the standstill period has ended until entering the next standstill period are to be set according to a predetermined table; but instead of using a table, it is also possible to set them in accordance with a calculation based on the value of the average value DXIavr.

Furthermore, in the examples shown in FIG. 18, the threshold and the rotation amount of the PF motor 1 that is permitted after the standstill period has ended until entering the next standstill period are to be set in terms of radian; but it is also possible to set them in terms of number of times of rotations.

Furthermore, in the examples shown in FIG. 18, the values of the average value DXIavr are divided into three ranges; but it is also possible to set conditions in accordance with the driving load by dividing them into more ranges.

Furthermore, instead of estimating the driving load of the PF motor 1 using the output signal of the integral element 6*g*, it is also possible to estimate the driving load of the PF motor 1 using the output signal of the adder 6*i*. Moreover, there are a variety of methods for actually measuring or estimating the driving load of the PF motor 1; for example, it is also possible to connect, to the PF motor 1, a measurement equipment for measuring driving loads to measure the driving load.

Furthermore, the foregoing was an explanation for the case where the PF motor 1 is controlled, but the same control method can also be applied to the CR motor 4.

===Computer System, Computer Program, and Storage Medium===

Next, referring to the drawings, explanation will be made of an embodiment of a computer system, a computer program and a storage medium on which the computer program is recorded, in accordance with the present invention.

Figure 19:
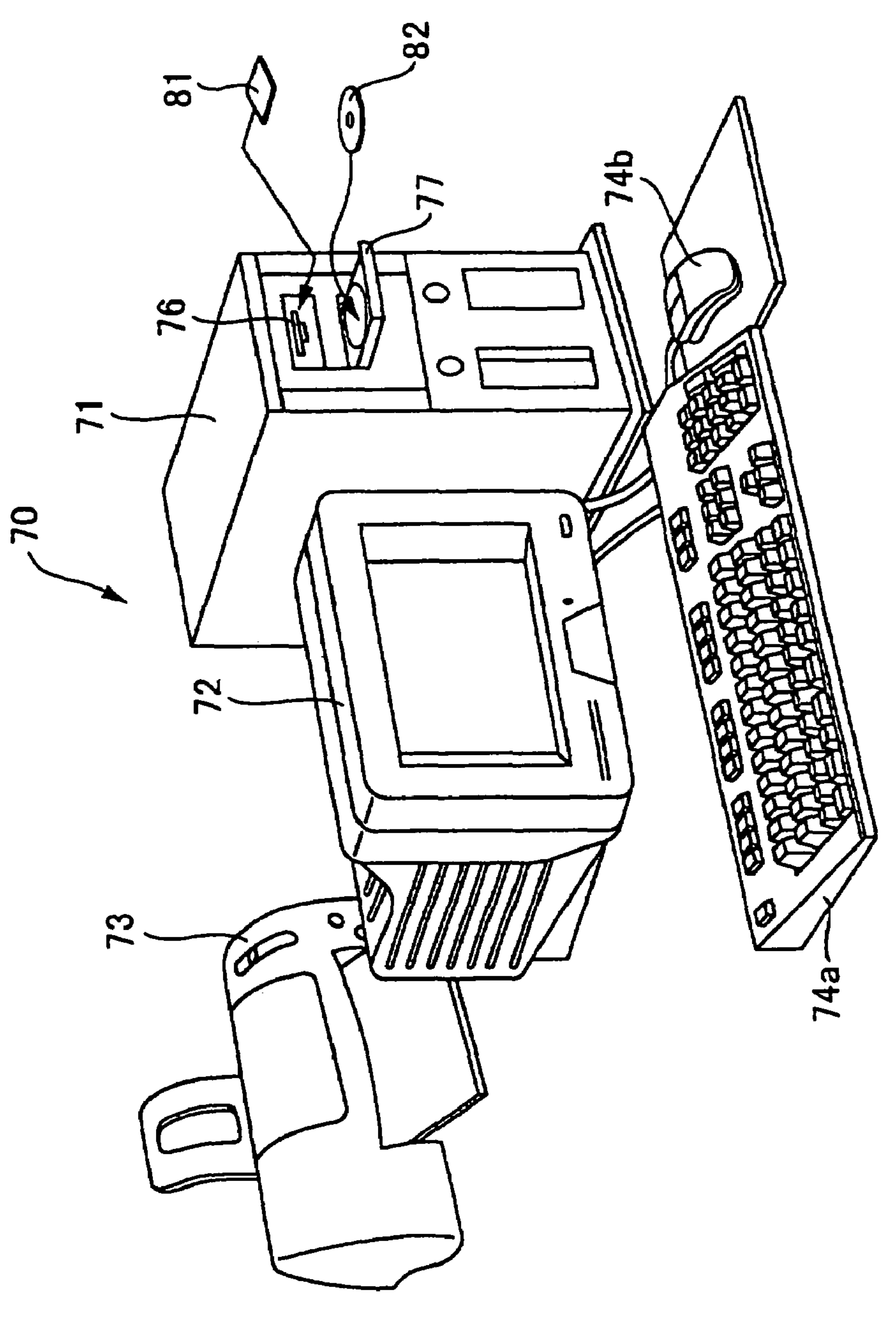
FIG. 19 is an explanatory diagram showing the external configuration of a computer system.
Figure 20:
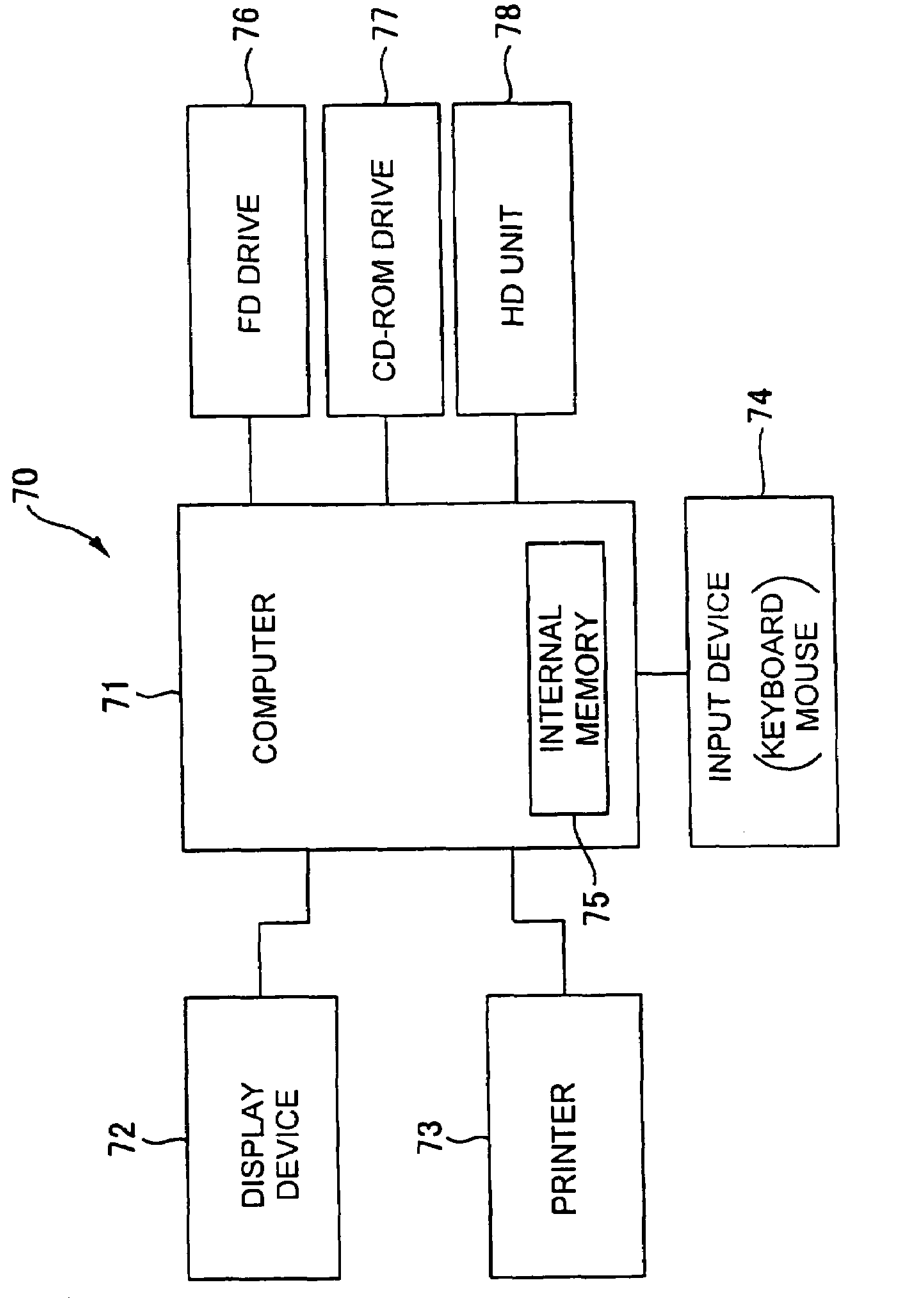
FIG. 20 is a block diagram showing the configuration of the computer system shown in FIG. 19.

FIG. 19 is an explanatory diagram illustrating the external configuration of a computer system, and FIG. 20 is a block diagram illustrating the configuration of the computer system shown in FIG. 19.

The computer system 70 shown in FIG. 19 includes: a main computer unit 71 housed in a casing such as a mini-tower; a display device 72 such as a CRT (cathode ray tube), a plasma display, or a liquid crystal display; a printer 73 serving as a record producing apparatus; a keyboard 74*a* and a mouse 74*b* serving as input devices; a flexible disk drive device 76; and a CD-ROM drive device 77.

FIG. 20 illustrates the configuration of this computer system 70 as a block diagram, and shows that an internal memory 75, such as a RAM (random access memory), and an external memory, such as a hard-disk drive unit 78, are further provided in the casing that houses the main computer unit 71.

A computer program executing a motor control method or motor driving method in accordance with the present invention is recorded on a flexible disk 81 or a CD-ROM (read-only memory) 82 which serve as a storage medium, and is read in with the flexible disk drive device 76 or the CD-ROM drive device 77. It should be noted that it is also possible to use an MO (magneto-optical) disk, a DVD (digital versatile disk) or any other optical recording disk, a card memory, or a magnetic tape or the like as the storage medium. Furthermore, it is also possible to arrange for the computer program to be downloaded to the computer system 70 over a communications network such as the Internet.

It should be noted that the foregoing explanation was given for an example in which the computer system is configured by connecting the printer 73 to the main computer unit 71, the display device 72, the input devices, the flexible disk drive device 76 and the CD-ROM drive device 77; however, it is also possible that the printer 73 is provided with some of the functions or structure of the main computer unit 71, the display device 72, the input devices, the flexible disk drive devices 76, and the CD-ROM drive device 77. For example, it is possible that the printer 73 is provided with a configuration having an image processor for image processing, a display section for various kinds of display, and a recording media mounting section for detachably mounting a recording medium on which image data captured with a digital camera or the like are stored.

===Method for Determining the Current Flowing Through Motor===

Next, explanation will be made of how the value of the current flowing through a motor, for example the PF motor 1, is determined.

When Econt is the constant voltage applied to a motor such as the PF motor 1, Rm is the resistance of the motor, I is the current that flows through the motor, DXIavr is the average value of the output of the integral element 6*g* obtained by the above-mentioned measurement, Ω is the rotation speed of the motor, Ec is the counter electromotive voltage coefficient of the motor, Kt is the motor torque constant, and 2000 is the integral element output value indicating a duty percentage of 100%, then the following relation holds:

$$Kt \times I = Kt \times (DXIavr \times Econt/2000 - \Omega \times Ec)/Rm$$

From this relation, the relation I=(DXIavr×Econt/2000−Ω×Ec)/Rm is derived.

Consequently, the value of the current flowing through the motor can be determined from the above-described measurement if the output value DXIavr of the integral element 6*g* is known.

However, since there are individual differences between the motors and power sources used for inkjet printers, the values for the above-mentioned Econt, Rm and Ec will be different depending on the motor and the power source that are used.

Consequently, if the current I flowing through the motor is determined indiscriminately from the output value DXIavr of the measured integral element 6*g* using the Econt, Rm and Ec for a standard motor and power source, then errors will occur.

In order to address this problem, in the present embodiment, the current I flowing through individual motors is to be determined according to the following method.

First of all, a first method for determining the current I flowing through individual motors is explained.

When DXIavr1 is the output value of the integral element 6*g* when the motor is rotated at the rotation speed Ω1 and DXIavr2 is the output value of the integral element 6*g* when the motor is rotated at the rotation speed Ω2, then the following equations hold:

$$I1 = (DXIavr1 \times Econt/2000 - \Omega1 \times Ec)/Rm \qquad \text{Equation 1:}$$

$$I2 = I1 + \alpha = (DXIavr2 \times Econt/2000 - \Omega1 \times Ec)/Rm \qquad \text{Equation 2:}$$

Here, α is a current difference that is caused by a dynamic load difference between the rotation speeds Ω1 and Ω2.

The following relation is derived from Equation 1 and Equation 2:

$$DXIavr2 - DXIavr1 = \{(\Omega2 - \Omega1) \times Ec + \alpha \times Rm\}/Econt \times 2000 \qquad \text{Equation 3:}$$

Here, as mentioned above, the values of α, Econt, Rm and Ec for the standard motor and power source differ from the values of α, Econt, Rm and Ec for individual motors and power sources.

Consequently, the value of (DXIavr2−DXIavr1) calculated by substituting the values of α, Econt, Rm and Ec of a standard motor and power source on the right side of Equation 3 will be different from the value of (DXIavr2−DXIavr1) calculated by substituting the values of α, Econt, Rm and Ec of individual motors and power sources on the right side of Equation 3.

Furthermore, the value of DXIavr1 is obtained by rotating the motor at the rotation speed Ω1 and performing a measurement. Based on the value of the resulting DXIavr1, the value of I1 calculated by substituting the values of Econt, Ec, and Rm of a standard motor and power source on the right side of Equation 1 will be different from the value of I1 calculated by substituting the values of Econt, Ec, and Rm of individual standard motors and power sources on the right side of Equation 1.

Thus, in the first method, the relation between the following is determined in beforehand for individual motors and power sources:

i) the value of (DXIavr2−DXIavr1) calculated by substituting the values of α, Econt, Rm and Ec of an individual motor and power source on the right side of Equation 3, and ii) based on the value of DXIavr1 obtained by measurement, the difference (calculation error) between the value of I1 calculated by the values of Econt, Ec and Rm for the standard motor and power source are substituted on the right side in Equation 1 and the value of I1 calculated by the values of Econt, Ec and Rm for the individual motor and power source are substituted on the right side in Equation 1.

Thus, it becomes possible to know how much calculation error will occur by calculating the current value flowing through the motor using the values of Econt, Ec and Rm for the standard motor and power source, when the difference between the measured values when the motor is rotated at two different rotation speeds takes on a certain value. Consequently, with the first method, the current value calculated using the values of Econt, Ec and Rm for the standard motor and power source are compensated by that calculation error.

Next, explanation will be made of a second method for determining the current I flowing through individual motors.

First, for individual motors and power sources: measurements are performed by letting the motor rotate at a rotation speed Ω1 and a rotation speed Ω2; the output value DXIavr1 of the integration element 6*g* when the motor is rotated at the rotation speed Ω1 and the output value DXIavr2 of the integration element 6*g* when the motor is rotated at the rotation speed Ω2 are measured; and (DXIavr2−DXIavr1) is calculated.

Then, the current values I1 and I2 flowing through the motor when the motor is respectively rotated at the rotation speed Ω1 and the rotation speed Ω2 are measured.

Based on the measured value of DXIavr1, the value of I1 is determined by substituting the values of Econt, Ec and Rm for the standard motor and power source on the right side of Equation 1. The value of I1 obtained as the result of this calculation will be different from the value of I1 that has been actually measured.

Thus, in the second method, the relation between the following for the individual motors and power sources is calculated in beforehand:

iii) the value of (DXIavr2−DXIavr1) measured while letting the individual motor rotate at the two different rotation speeds, and iv) based on the value of DXIavr1 obtained by measurement, the difference (calculation error) between the value of I1 calculated by substituting the Econt, Ec and Rm for the standard motor and power source on the right side in Equation 1 and the actually measured value of I1.

Thus, it becomes possible to know how much calculation error will occur, by calculating the current value flowing through the motor using the values of Econt, Ec and Rm for the standard motor and power source, when the difference between the measured values when the motor is rotated at two different rotation speeds takes on a certain value. Consequently, with the first method, the current value calculated using the values of Econt, Ec and Rm for the standard motor and power source are compensated by that calculation error.

MODIFIED EXAMPLE

It should be noted that if the load of the motor is to be estimated and applied to several controls, then it would be possible to compensate and determine the current amount corresponding to the load, taking the difference between a plurality of measurement values (duties) as a parameter. Alternatively, it is also possible to establish a correspondence with discrete measurement differences to compensate and determine the current amount, which corresponds to the load, so that it takes a desired value.

By adopting this embodiment, a favorable control can be realized that will not be influenced by the characteristics of each motor.

INDUSTRIAL APPLICABILITY (1) In accordance with a first invention, it is possible to realize a motor control method with which a motor can be controlled according to PWM control at high precision, a motor control device executing this control method, a printer executing this control method, a computer program causing a motor control device to execute this control method, a storage medium on which the program has been recorded, and a computer system executing this control method.

(2) In accordance with a second invention, it is possible to realize a motor control method with which a motor can suitably be controlled corresponding to the driving load of the motor, a motor control device executing this control method, a printer executing this control method, a computer program causing a motor control device to execute this control method, a storage medium on which the program has been recorded, and a computer system executing this control method.

(3) In accordance with a third invention, it is possible to realize a motor driving method with which a motor can suitably be driven in correspondence with the driving load of the motor, a motor driving device executing this driving method, a printer executing this driving method, a computer program causing a motor driving device to execute this driving method, a storage medium on which the program has been recorded, and a computer system executing this driving method.

(4) In accordance with a fourth invention, it is possible to realize a motor control device, with which it is possible to convert an output value of integration means obtained by a measurement into an absolute load value (current value) in consideration of individual differences between motors, a motor control device that can realize a printer, and a printer.

The invention claimed is:

1. A motor control device method comprising preparing a control system, being capable of controlling said motor by PWM and having an integral element being capable of outputting an integrated value obtained by integrating a deviation between a rotation speed and a target rotation speed of a motor, and starting control with said control system for causing said motor to rotate at the target rotation speed after rotation of said motor has been started, wherein said method comprising setting an output value of said integral element at a time when control with said control system is to be started is set to have a value that corresponds to a counter electromotive force generated in said motor during rotating at said target rotation speed, wherein said motor is a paper-feed motor of a printer.

2. A motor control method according to claim 1, wherein for each of a plurality of target rotation speeds, a relation between the target rotation speed and the output value of said integral element when the motor was controlled by said control system to rotate at that target rotation speed is stored, and based on said stored relation, the output value of said integral element at said time when the control is to be started is set to have a value corresponding to the target rotation speed.

3. A motor control method according to claim 2, wherein the relation between the target rotation speed and the output value of said integral element is acquired when a difference between the rotation speed and the target rotation speed of said motor controlled by said control system has become equal to or less than a predetermined value.

4. A motor control method comprising preparing a control system being capable of controlling said motor by PWM and having an integral element being capable of outputting an integrated value obtained by integrating a deviation between a rotation speed and a target rotation speed of a motor, and starting control with said control system for causing said motor to rotate at the target rotation speed after rotation of said motor has been started, wherein said method comprising setting an output value of said integral element at a time when control with said control system is to be started is set to have a value that corresponds to a counter electromotive force generated in said motor during rotating at said target rotation speed, wherein an output value I1 of said integral element when said motor is being controlled by said control system to rotate at a target rotation speed V1, and an output value I2 of said integral element when said motor is being controlled by said control system to rotate at a target rotation speed V2 which is different from the rotation speed V1 are stored, and the output value of said integral element at said time when the control is to be started is determined based on a calculation using said V1, said V2, said I1 and said I2.

5. A motor control method according to claim 4, wherein, when VMAX is a maximum rotation speed of said motor, said V1 and said V2 satisfy relations 0<V1.ltoreq.(2.times.VMAX/3) and 0<V2.ltoreq.(2.times.VMA−X/3).

6. A motor control method comprising a control system, preparing a control system being capable of controlling said motor by PWM and having an integral element being capable of outputting an integrated value obtained by integrating a deviation between a rotation speed and a target rotation speed of a motor, and starting control with said control system for causing said motor to rotate at the target rotation speed after rotation of said motor has been started, wherein said method comprising setting an output value of said integral element at a time when control with said control system is to be started is set to have a value that corresponds to a counter electromotive force generated in said motor during rotating at said target rotation speed, wherein said control system further comprises derivative means being capable of outputting a value corresponding to a derivative value obtained by differentiating the deviation between the rotation speed and the target rotation speed of the motor, and proportional means being capable of outputting a value that is proportional to the deviation between the rotation speed and the target rotation speed of the motor.

7. A motor control method comprising a control system, preparing a control system being capable of controlling said motor by PWM and having an integral element being capable of outputting an integrated value obtained by integrating a deviation between a rotation speed and a target rotation speed of a motor, and starting control with said control system for causing said motor to rotate at the target rotation speed after rotation of said motor has been started, wherein said method comprising setting an output value of said integral element at a time when control with said control system is to be started is set to have a value that corresponds to a counter electromotive force generated in said motor during rotating at said target rotation speed, wherein said motor is a carriage motor of a printer.

8. A motor control device comprising:

a control system capable of controlling said motor by PWM and having an integral element being capable of outputting an integrated value obtained by integrating a deviation between a rotation speed and a target rotation speed of a motor, said motor control device of starting control with said control system for causing said motor to rotate at the target rotation speed after rotation of said motor has been started, wherein an output value of said integral element at a time when control with said control system is to be started to have a value that corresponds to a counter electromotive force generated in said motor during its rotation at said target speed, wherein said motor is a paper-feed motor of a printer.

9. A printer comprising a control system, said control system being capable of controlling said motor by PWM and having an integral element being capable of outpuffing an integrated value obtained by integrating a deviation between a rotation speed and a target rotation speed of a motor, said printer being capable of starting control with said control system for causing said motor to rotate at the target rotation speed after rotation of said motor has been started, wherein an output value of said integral element at a time when control with said control system is to be started is set to have a value that corresponds to a counter electromotive force generated in said motor during its rotation at said target speed, wherein said motor is a paper-feed motor of a printer.

10. A computer-readable storage medium storing a computer program for a motor control device, said motor control device comprising a control system that is capable of controlling said motor by PWM and that has an integral element being capable of outputting an integrated value obtained by integrating a deviation between a rotation speed and a target rotation speed of a motor, said motor control device being capable of starting control with said control system for causing said motor to rotate at the target rotation speed after rotation of said motor has been started, said computer program being capable of causing said motor control device to set an output value of said integral element at a time when control with said control system is to be started to have a value that corresponds to a counter electromotive force generated in said motor during its rotation at said target speed, wherein said motor is a paper-feed motor of a printer.

11. A computer system comprising: a main computer unit; a display device; an input device; and a printer having a control system that is capable of controlling said motor by PWM and that has an integral element being capable of outputting an integrated value obtained by integrating a deviation between a rotation speed and a target rotation speed of a motor, and being capable of starting control with said control system for causing said motor to rotate at the target rotation speed after rotation of said motor has been started, wherein an output value of said integral element at a time when control with said control system is to be started is set to have a value that corresponds to a counter electromotive force generated in said motor during its rotation at said target speed, wherein said motor is a paper-feed motor of a printer.

12. A printer comprising an image processor, a display section, a recording media mounting section, and a control system that is capable of controlling a motor by PWM and that has an integral element being capable of outputting an integrated value obtained by integrating a deviation between a rotation speed and a target rotation speed of said motor, said printer being capable of starting control with said control system for causing said motor to rotate at the target rotation speed after rotation of said motor has been started, wherein an output value of said integral element at a time when control with said control system is to be started is set to have a value that corresponds to a counter electromotive force generated in said motor during its rotation at said target speed, wherein said motor is a paper-feed motor of a printer.

13. A motor control device for starting driving of a motor with an initial driving signal, causing a rotation speed to increase by successively adding a predetermined value to a value of this initial driving signal while sequentially driving said motor with a driving signal whose signal value has a value obtained as a result of the successive addition, and, when said rotation speed has reached a predetermined rotation speed, performing feedback control of said motor by a control system having an integral element, wherein at least one of said initial driving signal value and said predetermined value is set in accordance with a driving load of said motor.

14. A motor control device according to claim 13, wherein: said motor is driven by PWM; said initial driving signal value is an initial duty; said predetermined value is a predetermined duty; and at least one of said initial duty and said predetermined duty is set in accordance with an output value of said integral element when control of said motor was carried out with said control system.

15. A motor control device according to claim 14, wherein: for each of a plurality of target rotation speeds, a relation between said target rotation speed and the output value of said integral element when the motor was controlled by said control system to rotate at that target rotation speed is acquired; and based on said relation, at least one of said initial duty and said predetermined duty is set.

16. A motor control device according to claim 15, wherein the relation between the target rotation speed and the output value of said integral element is acquired when a difference between the rotation speed and the target rotation speed of said motor being controlled by said control system has become equal to or less than a predetermined value.

17. A motor control device for starting driving of a motor with an initial driving signal which is for causing a gear provided on a motor shaft to abut against an engaged gear that engages said gear, then, after driving said motor with a driving signal having a signal value larger than a value of said initial driving signal, causing a rotation speed to increase by successively adding a predetermined value to this signal value while sequentially driving said motor with a driving signal whose signal value has a value obtained as a result of the successive addition, and, when said rotation speed has reached a predetermined rotation speed, performing feedback control of said motor by a control system having an integral element, wherein at least one of said initial driving signal value, said signal value larger than said initial driving signal value, and said predetermined value is set in accordance with a driving load of said motor.

18. A motor control device according to claim 17 wherein: said motor is driven by PWM; said initial driving signal value is an initial duty; said predetermined value is a predetermined duty; and at least one of said initial driving signal value, said signal value larger than said initial driving signal value, and said predetermined duty is set based on an output value of said integral element when control of said motor was carried out with said control system.

19. A motor control device according to claim 18, wherein: for each of a plurality of target rotation speeds, a relation between said target rotation speed and the output value of said integral element when the motor was controlled by said control system to rotate at that target rotation speed is acquired; and based on said relation, at least one of said initial driving signal value, said signal value larger than said initial driving signal value, and said predetermined duty is set.

20. A motor control device according to claim 19, wherein the relation between the target rotation speed and the output value of said integral element is acquired when a difference between the rotation speed and the target rotation speed of said motor controlled by said control system has become equal to or less than a predetermined value.

21. A motor control device according to claim 13, wherein said motor is a paper-feed motor of a printer.

22. A motor control device according to claim 13, wherein said motor is a carriage motor of a printer.

23. A motor driving device for driving a motor while providing a forced standstill period when a total rotation amount of said motor reaches a threshold after starting rotation of the motor, wherein at least one of said threshold, a length of said standstill period, and a rotation amount of said motor that is permitted after said standstill period has ended until entering a next standstill period is set in accordance with a driving load of said motor, wherein said motor is driven by PWM with a control system that has integral element performing integration of a deviation between a rotation speed and a target rotation speed of said motor and performing output of a value corresponding to a value of the integration; and at least one of said threshold, a length of said standstill period, and a rotation amount of said motor that is permitted after said standstill period has ended until entering a next standstill period is set in accordance with an output value of said integral element when control of said motor was carried out with said control system, wherein, if the output value of said integral element taken when said motor was controlled with the control system exceeds a predetermined value, then driving of the motor is not performed and a warning is made to a user.

24. A motor driving device according to claim 23, wherein a relation between the target rotation speed and the output value of said integral element is acquired when a difference between the rotation speed and the target rotation speed of said motor being controlled by said control system has become equal to or less than a predetermined value.

25. A motor driving device according to claim 23, wherein said motor is a paper-feed motor of a printer.

26. A motor driving device according to claim 23, wherein said motor is a carriage motor of a printer.

* * * * *